(12) United States Patent
McCollum et al.

(10) Patent No.: US 9,623,569 B2
(45) Date of Patent: Apr. 18, 2017

(54) AUTONOMOUS TRUCK LOADER AND UNLOADER

(71) Applicant: Intelligrated Headquarters, LLC, Mason, OH (US)

(72) Inventors: Joshua McCollum, St. Charles, MO (US); Thomas S. Simone, Fenton, MO (US); Michael Girtman, O'Fallon, MO (US)

( * ) Notice: Subject to any disclaimer, the term of this patent is extended or adjusted under 35 U.S.C. 154(b) by 94 days.

(21) Appl. No.: 14/675,697

(22) Filed: Mar. 31, 2015

(65) Prior Publication Data

US 2015/0274447 A1    Oct. 1, 2015

Related U.S. Application Data

(63) Continuation-in-part of application No. 14/279,694, filed on May 16, 2014.

(Continued)

(51) Int. Cl.

| | |
|---|---|
| *B65G 59/02* | (2006.01) |
| *B25J 15/00* | (2006.01) |
| *B65G 67/24* | (2006.01) |
| *B65G 67/20* | (2006.01) |
| *B25J 15/06* | (2006.01) |

(Continued)

(52) U.S. Cl.
CPC ......... *B25J 15/0014* (2013.01); *B25J 9/0093* (2013.01); *B25J 11/00* (2013.01); *B25J 15/0052* (2013.01); *B25J 15/0616* (2013.01); *B25J 15/10* (2013.01); *B65G 59/02* (2013.01); *B65G 67/20* (2013.01); *B65G 67/24* (2013.01)

(58) Field of Classification Search
CPC . B25J 9/0093; B25J 11/00; B25J 15/10; B25J 15/0014; B25J 15/0616; B25J 15/0052; B65G 67/24; B65G 59/02; B65G 69/008; B65G 37/005; B65G 67/20; B66C 1/02; H01L 21/6838
USPC ......... 414/795.4, 795.7, 795.9, 796.2, 796.4, 414/796.5, 796.6; 198/540, 562, 183, 198/188, 65
See application file for complete search history.

(56) References Cited

U.S. PATENT DOCUMENTS

| | | |
|---|---|---|
| 2,305,512 A | 12/1942 | Broekhuysen |
| 2,596,265 A | 5/1952 | Manierre |

(Continued)

FOREIGN PATENT DOCUMENTS

| | | |
|---|---|---|
| DE | 103 24 755 A1 | 9/2004 |
| DE | 20 2004 009 581 U1 | 10/2004 |

(Continued)

OTHER PUBLICATIONS

International Search Report and Written Opinion dated Sep. 12, 2014 for Application No. PCT/US2014/038513.

(Continued)

*Primary Examiner* — Stephen Vu

(57) ABSTRACT

An autonomous device for loading and unloading trucks comprises a mobile body, a robot arm and a body conveyor system to convey cartons during loading and unloading. A manipulator attaches to a moveable end of the robot arm and is maneuverable within the tight confines of the truck. The manipulator picks up a row of articles at a first location and places the row of articles down at a second location. The manipulator is reconfigurable to match to both locations.

48 Claims, 31 Drawing Sheets

Related U.S. Application Data

(60) Provisional application No. 61/973,188, filed on Mar. 31, 2014, provisional application No. 61/985,417, filed on Apr. 28, 2014.

(51) Int. Cl.
*B25J 9/00* (2006.01)
*B25J 11/00* (2006.01)
*B25J 15/10* (2006.01)

(56) References Cited

U.S. PATENT DOCUMENTS

| | | |
|---|---|---|
| 2,605,912 A | 8/1952 | Small et al. |
| 3,651,963 A | 3/1972 | McWilliams |
| 3,715,043 A | 2/1973 | Weir |
| 3,837,510 A | 9/1974 | McWilliams |
| 3,850,313 A | 11/1974 | Rackman et al. |
| 4,242,025 A | 12/1980 | Thibault |
| 4,252,495 A | 2/1981 | Cook |
| 4,281,955 A | 8/1981 | McWilliams |
| 4,597,707 A | 7/1986 | Cornacchia |
| 4,692,876 A | 9/1987 | Tenma et al. |
| 4,721,005 A | 1/1988 | Yoshiji et al. |
| 4,747,193 A | 5/1988 | Hashidate et al. |
| 4,802,377 A | 2/1989 | Keppler |
| 4,836,111 A | 6/1989 | Kaufmann |
| 4,941,794 A | 7/1990 | Hara et al. |
| RE33,416 E | 10/1990 | Konishi et al. |
| 4,968,214 A | 11/1990 | Shiotani |
| 4,976,584 A | 12/1990 | Focke |
| 5,009,560 A | 4/1991 | Ruder et al. |
| 5,015,145 A | 5/1991 | Angell et al. |
| 5,067,867 A | 11/1991 | Ruder et al. |
| 5,108,255 A | 4/1992 | Cornacchia |
| 5,201,626 A | 4/1993 | Hansen |
| 5,256,021 A | 10/1993 | Wolf et al. |
| 5,325,953 A | 7/1994 | Doster et al. |
| 5,388,948 A | 2/1995 | Jerome |
| 5,391,038 A | 2/1995 | Stewart |
| 5,466,116 A | 11/1995 | Jerome |
| 5,476,358 A | 12/1995 | Costa |
| 5,524,747 A | 6/1996 | Wohlfahrt et al. |
| 5,605,432 A | 2/1997 | Fink et al. |
| 5,642,803 A | 7/1997 | Tanaka |
| 5,685,416 A | 11/1997 | Bonnet |
| 5,694,753 A | 12/1997 | Dellinger |
| 5,697,753 A | 12/1997 | Aurora et al. |
| 5,716,184 A | 2/1998 | Lowe et al. |
| 5,718,325 A | 2/1998 | Doster et al. |
| 5,738,487 A | 4/1998 | Schaede et al. |
| 5,743,705 A | 4/1998 | Eissfeller |
| 5,913,655 A | 6/1999 | Maday |
| 5,921,740 A | 7/1999 | Stewart |
| 5,984,621 A | 11/1999 | Letson |
| 5,997,240 A | 12/1999 | Focke et al. |
| 6,116,841 A | 9/2000 | Iwasaki |
| 6,234,737 B1 | 5/2001 | Young et al. |
| 6,234,745 B1 * | 5/2001 | Pugh .................. B65G 59/02 414/794.5 |
| 6,238,175 B1 | 5/2001 | Götz et al. |
| 6,484,862 B1 | 11/2002 | Gilmore et al. |
| 6,502,877 B2 | 1/2003 | Schick et al. |
| 6,545,440 B2 | 4/2003 | Slater et al. |
| 6,629,594 B2 | 10/2003 | Nagel et al. |
| 6,634,686 B2 | 10/2003 | Hosokawa |
| 6,860,531 B2 | 3/2005 | Sherwin |
| 6,923,085 B2 | 8/2005 | Nakano |
| 7,108,125 B2 | 9/2006 | Gilmore et al. |
| 7,168,910 B2 | 1/2007 | Keller |
| 7,387,485 B2 | 6/2008 | Dickey et al. |
| 7,469,782 B2 | 12/2008 | Hutton |
| 7,641,247 B2 | 1/2010 | Blonigan et al. |
| 7,648,329 B2 | 1/2010 | Chilson et al. |
| 7,748,761 B2 | 7/2010 | Simons |
| 7,967,543 B2 | 6/2011 | Criswell et al. |
| 7,994,793 B2 | 8/2011 | Matsumoto et al. |
| 8,011,706 B2 | 9/2011 | Schmidt et al. |
| 8,086,343 B2 | 12/2011 | Slocum, III |
| 8,151,969 B2 | 4/2012 | Hoene |
| 8,162,362 B2 | 4/2012 | Braunschweiger et al. |
| 8,262,334 B2 | 9/2012 | Christensen et al. |
| 8,295,980 B2 | 10/2012 | Williamson |
| 8,325,458 B2 | 12/2012 | Prahlad et al. |
| 8,473,094 B2 * | 6/2013 | Becker ................ B65G 47/914 294/65 |
| 8,562,276 B2 | 10/2013 | Helmner |
| 8,562,277 B2 | 10/2013 | Criswell |
| 8,599,531 B2 | 12/2013 | Sundar et al. |
| 8,651,794 B2 | 2/2014 | Pippin |
| 2001/0014268 A1 | 8/2001 | Bryson, III et al. |
| 2002/0092728 A1 | 7/2002 | Tanaka |
| 2004/0071539 A1 | 4/2004 | Anater, Jr. et al. |
| 2004/0179924 A1 | 9/2004 | Lundahl et al. |
| 2008/0267756 A1 | 10/2008 | Echelmeyer et al. |
| 2010/0104403 A1 | 4/2010 | Cho et al. |
| 2010/0178137 A1 | 7/2010 | Chintalapati et al. |
| 2012/0076629 A1 | 3/2012 | Goff et al. |
| 2012/0207572 A1 | 8/2012 | Enenkel |
| 2012/0207577 A1 | 8/2012 | Stollery et al. |
| 2014/0341694 A1 | 11/2014 | Girtman et al. |

FOREIGN PATENT DOCUMENTS

| | | |
|---|---|---|
| DE | 10 2010 033 115 A1 | 2/2012 |
| EP | 2 156 927 A1 | 2/2010 |
| EP | 2 570 372 A1 | 3/2013 |
| JP | H05-105235 | 4/1993 |
| JP | H05-208731 | 8/1993 |
| JP | H09-301538 | 11/1997 |
| JP | 2004-289680 | 10/2004 |
| WO | WO 96/30287 | 10/1996 |
| WO | WO 98/51598 | 11/1998 |
| WO | WO 01/51356 | 7/2001 |
| WO | WO 2004/050518 | 6/2004 |
| WO | WO 2006/121329 | 11/2006 |
| WO | WO 2011/129699 | 10/2011 |
| WO | WO 2015/017444 | 2/2015 |

OTHER PUBLICATIONS

International Search Report and Written Opinion dated Jun. 15, 2015 for Application No. PCT/US2015/023744.

* cited by examiner

HEAD ISO

ACQUITION

AUTONOMOUS TRUCK LOADER AND UNLOADER

RELATED APPLICATIONS

The present application claims the benefit of priority to U.S. Provisional Application No. 61/973,188, entitled "ROBOTIC TRUCK LOADER WITH ALTERNATE VACUUM HEAD" filed Mar. 31, 2014 and assigned to the assignee hereof, U.S. Provisional Application No. 61/985,417, entitled "DOUBLE ACTING FLUIDIC CYLINDER FOR MATERIAL HANDLING" filed Apr. 28, 2014 and assigned to the assignee hereof, the entire contents of each of which are hereby incorporated by reference in their entirety.

The present Application for Patent is also a Continuation in Part of patent application Ser. No. 14/279,694 entitled ROBOTIC CARTON UNLOADER filed May 6, 2014, pending, and assigned to the assignee hereof and hereby expressly incorporated by reference in its entirety.

TECHNICAL FIELD

The present disclosure relates generally to vehicles that load and unload trucks, and is more particularly directed to an autonomous truck loader and unloader. The innovation will be disclosed in connection with, but not necessarily limited to, the autonomous truck loader and unloader with a reconfigurable article manipulator.

BACKGROUND

Trucks and trailers loaded with cargo and products move across the country to deliver products to commercial loading and unloading docks at stores, warehouses and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks can be loaded with forklifts if the loads are palletized, and with manual labor if the products are separate articles. Using human laborers to unload and load large truck shipments can be physically difficult, and can be costly due to the time and labor involved. Consequently, a significant need exists for an improved autonomous device that can quickly load and unload truck trailers more quickly than human laborers and at a reduced cost.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect of the subject innovation, an autonomous device for loading and unloading trucks is disclosed. The autonomous device comprises a mobile body and a robot arm coupled to the mobile body to load and unload articles. A body conveyor system attaches to the mobile body for conveying cartons, the conveyor thereof movable in a first direction to feed articles to the robot arm for loading, and movable in a second direction to move articles unloaded thereon out of the truck. A manipulator is attached to a moveable end of the robot arm and is maneuverable within the truck. The manipulator picks up a row of articles at a first location and places down the row of articles on a second location. The manipulator can be configured to match the orientation of the articles at the first location, and can be reconfigured to match the orientation of the row of articles to the second location.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
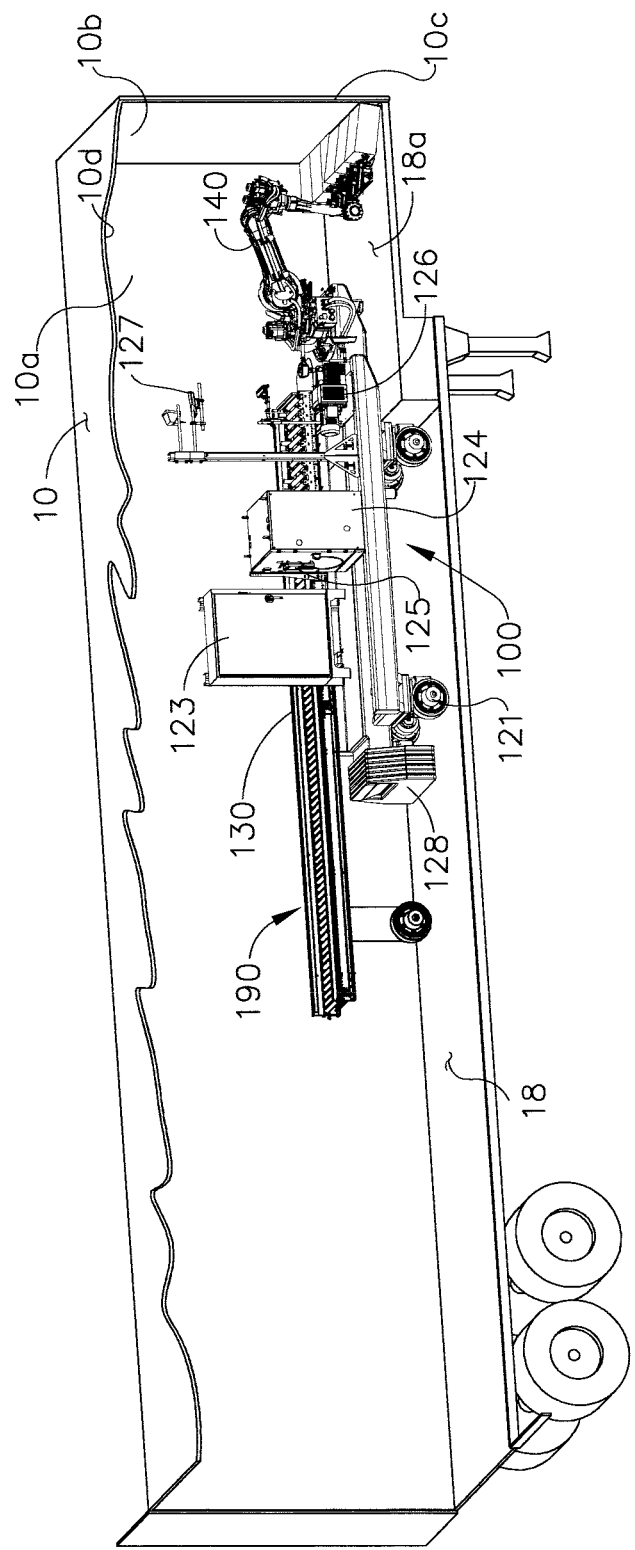
FIG. 1 illustrates an isometric view of an autonomous truck loader unloader driven into a truck.
Figure 2:
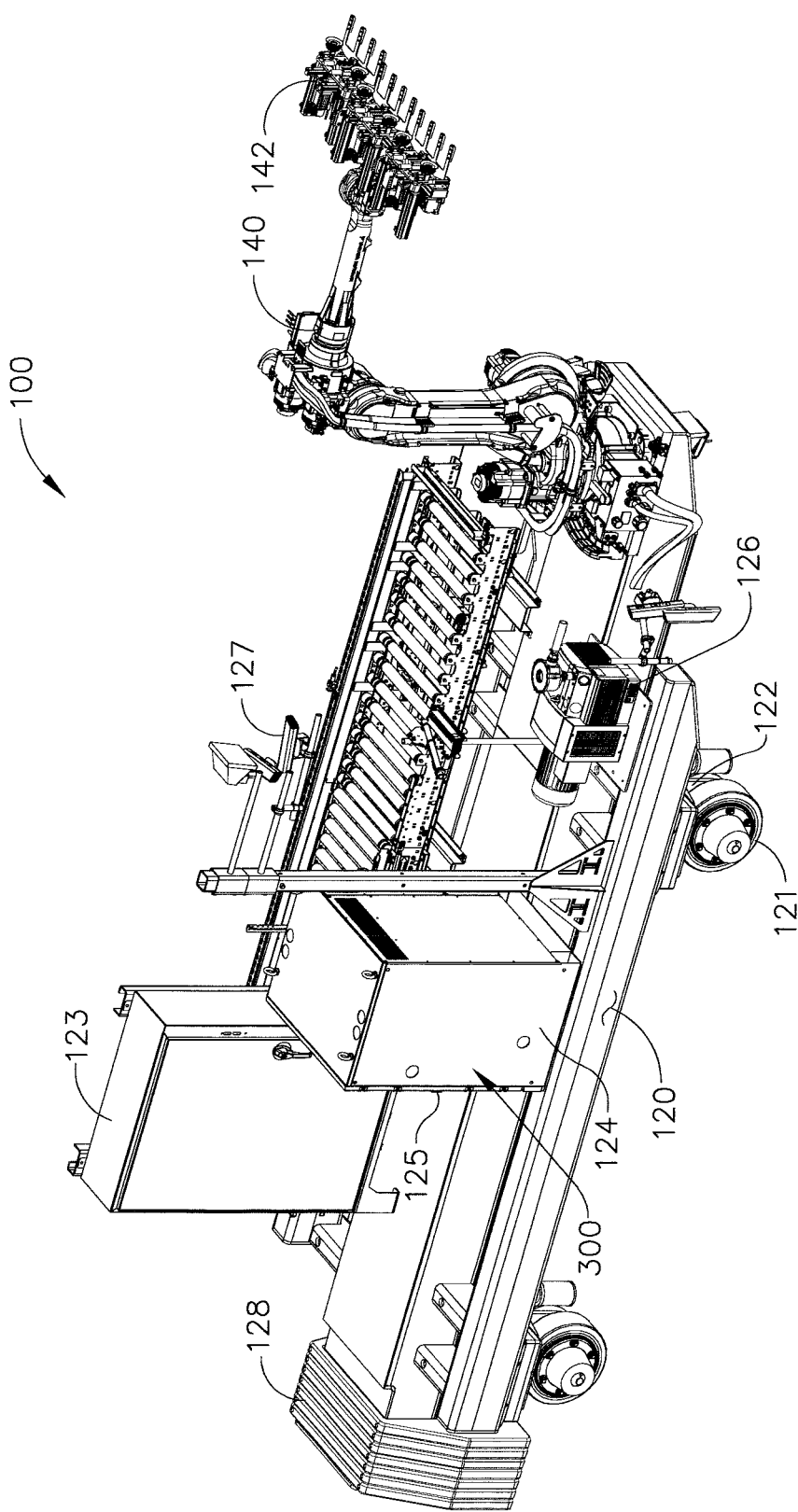
FIG. 2 illustrates an enlarged isometric view of the autonomous truck loader unloader of FIG. 1 with a configurable manipulator on an end of a robot arm.

The innovation disclosed herein, in one aspect thereof, is shown in FIGS. 1 and 2, and comprises an autonomous loading unloading device 100 that comprises a mobile body 120 that drives into a truck 10 or trailer, such as from a store, warehouse, or distribution center, and loads or unloads articles 12 within the confines of the truck with a robot arm 140 and a body conveyor 130. To speed up the loading or unloading process, the robot arm 140 includes a manipulator 142 of the present innovation at a free end thereof that is maneuverable within the confines of the truck to pick up a row 15 of side by side articles 12. The manipulator 142 can move the row 15 of articles 12 from a first location 16, and place the row 15 of articles 12 down on second location 17. Manipulator 142 is also configurable to match the orientation of the row of articles 12 at the first location 16 for pick up, and reconfigurable to match the orientation of the manipulator 142 and the picked up row of articles 12 to the second location 17 prior to placing the articles 12 down. For example, the manipulator 142 can configure to an irregular orientation to pick up an irregular row 15 of articles 12 resting on an irregular carton pile 11 at first location 16, vertically reconfigure one or more of the row 15 of articles 12 to a horizontal orientation, and place the reconfigured horizontal row 15 of articles 12 held therewith down onto a matching horizontal surface at the second location 17 (see FIGS. 23-25). In one embodiment, the autonomous loading unloading device 100 can image at least one of the first location 16 and the second location 17, and from that image, configure and reconfigure the manipulator 142 of the present innovation to match at least one of the first location 16 and the second location 17.

Figure 23:
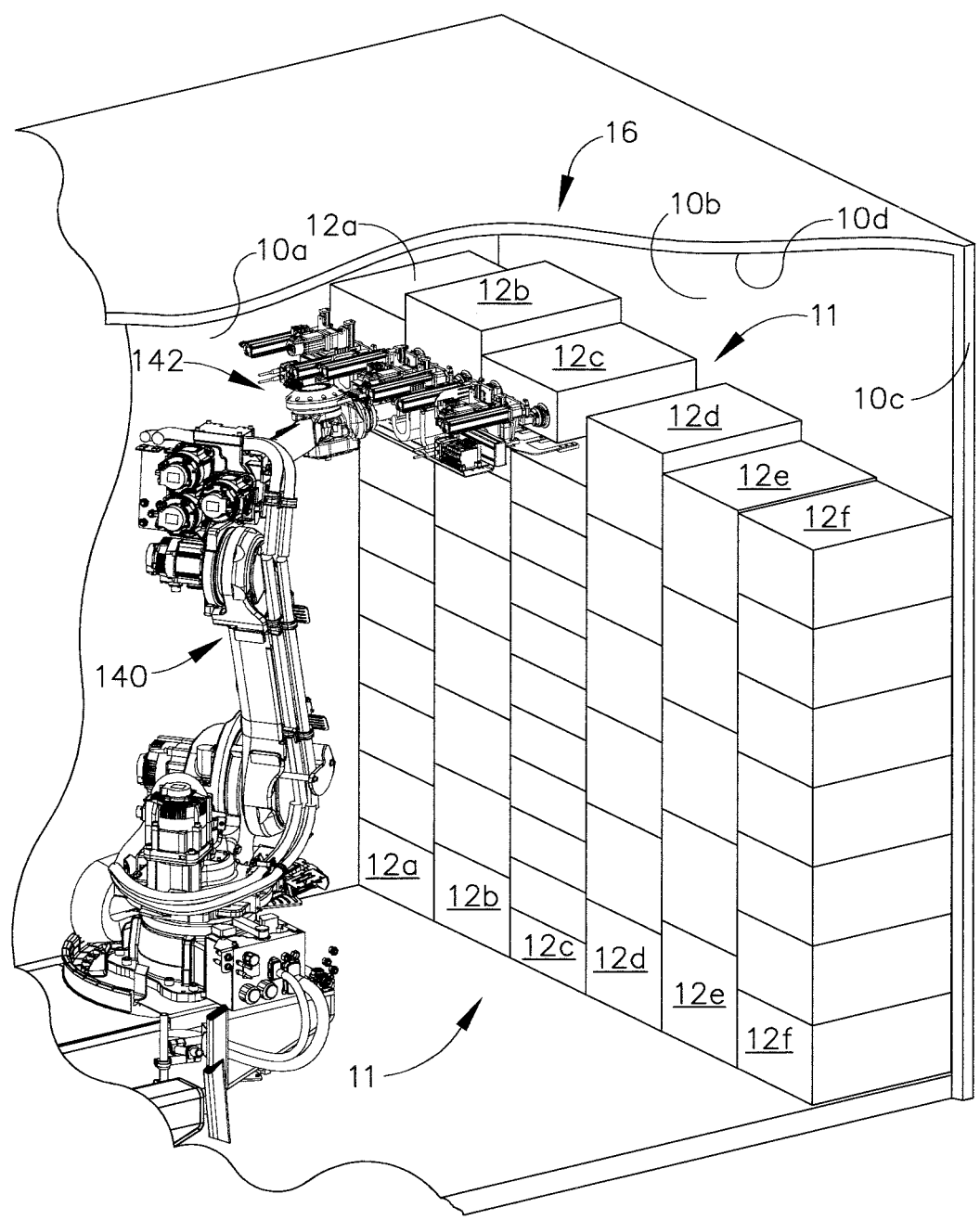
FIG. 23 illustrates an isometric view of the autonomous truck loader unloader of FIG. 22A in the truck and unloading a row of articles from a top of an irregular article pile in the truck.
Figure 24:
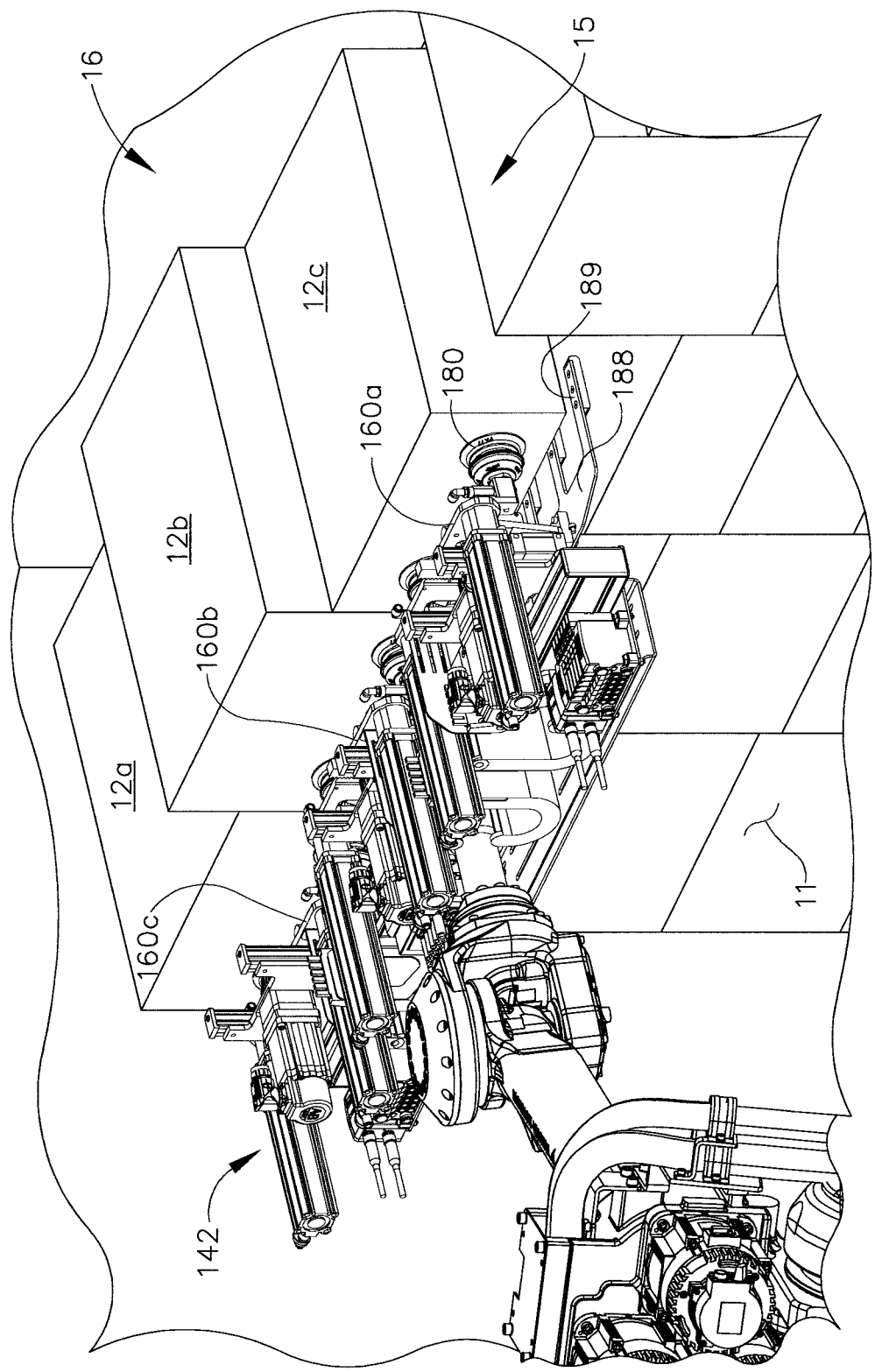
FIG. 24 illustrates an enlarged isometric view of FIG. 22 wherein all of the cartons being unloaded have a different height.
Figure 25:
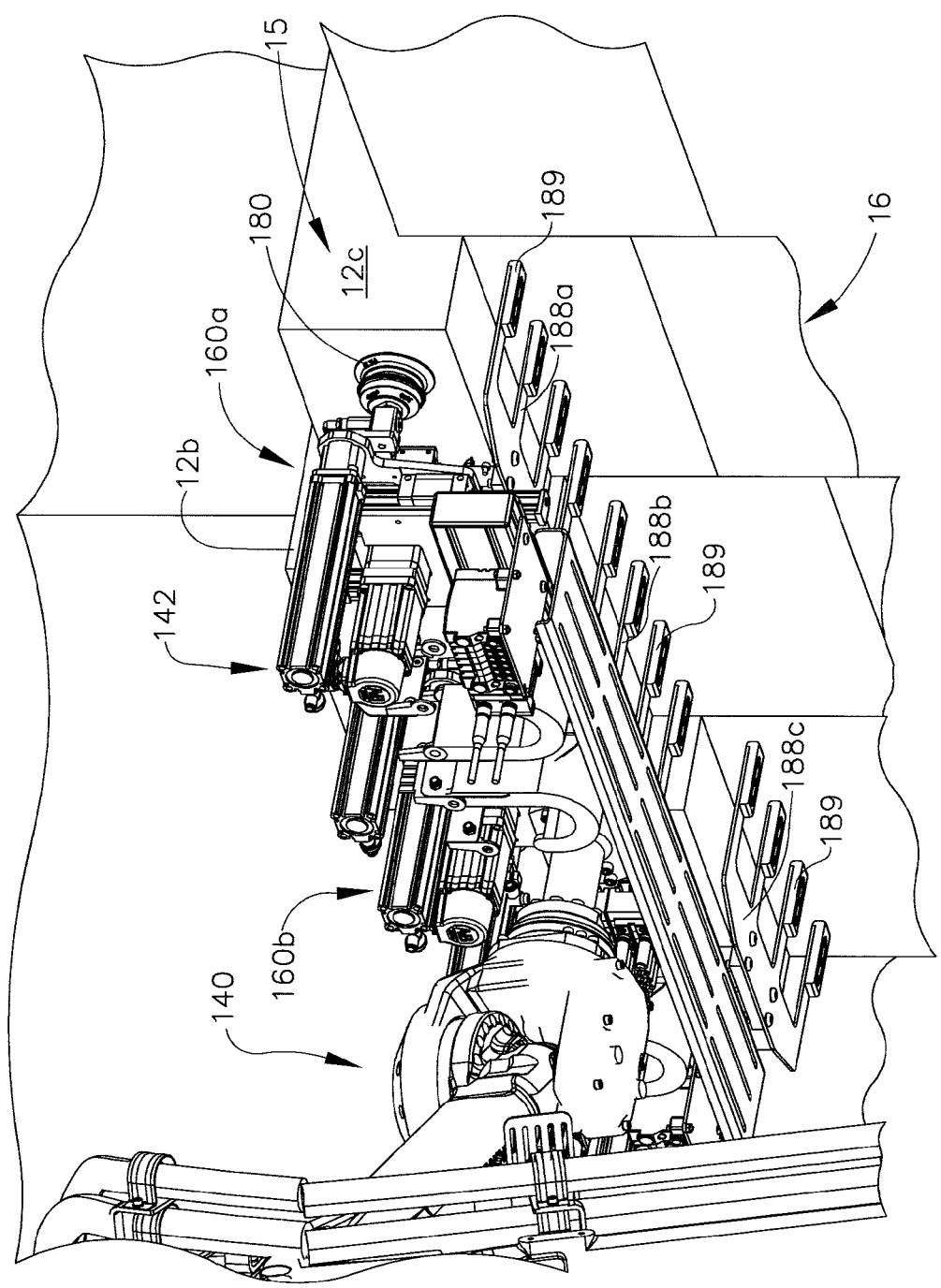
FIG. 25 illustrates an enlarged isometric view of the underside of the manipulator of FIG. 22.

When moving rows 15 of articles 12, the first location 16 and the second location 17 can comprise one or more of the body conveyor 130, a floor 18 in the warehouse or truck 10, a row 15 of articles 12 placed on the floor 18, and an article pile 11 comprising a plurality of articles 12 piled in rows 15 on top of each other. Each row 15 moved by manipulator 142 may be about half the width of the truck 10 which means two rows 15 of articles 12 laid side by side create a full row 15a of articles 12 extending from wall to wall across the truck 10. When working with article piles 11, the manipulator 142 will either pick new row 15 from an upper row 15 of the article pile 11, or place new row 15 onto a top of an upper row 15 of the article pile 11. Article piles 11 can be uniform or irregular. Uniform article piles 11 are formed from articles 12 of uniform size and have a horizontal upper row 15. Mixed case article piles 11 are formed from more than one size of articles 12, and the upper row 15 can be irregular or stepped as shown in FIGS. 23-25. While described for use in the truck 10, the autonomous loading unloading device 100 can also be used in any suitable location, such as without limitation in a store, warehouse, or distribution center.

In FIGS. 1 and 2, the automatic or autonomous loading unloading device 100 has mobile body 120 sized to drive in and out of the truck 10 on a plurality of wheels 121. Wheels 122 are powered by motors, and can be individually steered. Motors can be electrical and powered by batteries (not shown) within mobile body 120, or powered by a tether or electrical cord attached to the autonomous loading device 120. A power control box 123 is mounted to the body 120 an can receive and distribute electrical power required for operation. A system control box 124 is centrally located near one side of the mobile body 120 and can provide the logic, image processing, edge recognition, sequence computation, pneumatic or hydraulic control, vacuum control, vehicle movement, and machine control required to operate the autonomous loading unloading device 100 autonomously or automatically. Whereas all of these functions are described as being performed by the system control box 124, portions or all of the above described functions may be performed at other locations on the autonomous loading unloading device 100 such as with the mobile body 120, with the robot arm 140, with the camera 127, and the like. With the present innovation, at least one vision camera 127 can take an initial image of one or more of the first location 16 and the second location 17, and based on the one or more images and whether the task is loading or unloading, the system control box 124 can determine an appropriate loading or unloading sequence and then perform the sequence autonomously and without further visualization. Once the loading or unloading sequence is complete, the at least one vision camera 127 can take another snapshot and the process repeats until the truck 10 is loaded or unloaded. Vision camera 127 can also be used to provide imaging for an outside operator to manually steer the autonomous loading unloading device 100 and to look for dropped articles 12. Alternately, the images from the camera 127 can be received real time or before or after actions.

An input/output device 125 is shown tethered to a rear of the electronics box 124. The input/output device 125 has a variety of controls, is operator held, and has uses which can include: a vehicle on/off switch, steering and drive controls, test and diagnostics routines, and can include a keypad and screen. The keypad and screen can also be used to perform software diagnostics, edit or input software modifications, check visual input from at least one vision camera 127, and check system and component responses to input. The input/output device 125 can also drive the autonomous loading unloading device 100 and cameras 27 can display the path in front of or behind the autonomous loading unloading device 100 on the screen.

A combination air/vacuum pump 126 can be located near the robotic arm 140 and is a supply of both air and vacuum for the autonomous loading unloading device 100. While not shown in entirety, vacuum and air lines can run along an exterior of the robot arm 140 and the manipulator 142 for connection thereto.

In FIG. 1, the autonomous loading unloading device 100 is shown operating in a truck 10 having a stepped floor 19, comprising a portion of flat floor 18 and a portion of high floor 18a. The mobile body 120 of the autonomous loading unloading device 100 can overhang at least partially over the portion of high floor 18a to position the robot arm 140 at a location that can access any point within the truck 10 above floor 18a. The robotic arm 130 can be any available conventional robotic arm with multiple degrees of freedom of motion such as a YASKAWA MOTOMAN MS80W sold by YASKAWA America Inc. MOTOMAN Robotics Division at 100 Automation Way, Miamisburg Ohio 45342. Weights 128 may be attached to a rear of the mobile body 120 to counterbalance the overhung weight of the extended robot arm 140.

Manipulator 142 is illustrated in FIGS. 3-6 and comprises three individually movable head elements 160a, 160b, and 160c movably attached to a cross member 162. Each head element 160a-c is identical, operates individually, and each can pick up, hold, and place down one article 12. During operation, one or more head elements 160a-c may be used to move articles. As illustrated, manipulator 142 is limited to picking up and placing down a row 15 comprising a maximum of three side by side articles 12, but the present innovation is not meant to be limited thereto. Movable head elements 160a-c are shown attached to manipulator 142 in FIGS. 3 and 4, and head element 160c by itself in FIG. 5.

Cross member 162 further comprises a rearward extension 164 that attaches manipulator 142 to the free end of robot arm 140. Vertical guides 166a, 166b, 166c are secured to cross member 162, and extend vertically therefrom. Each head element 160a-c attaches to a respective vertical guide 166a-c, and each can be independently moved up or down upon a vertical axis 181 of the respective vertical guide 166a-c. Vertical axis 181 includes an arrowhead to indicate the vertical or up direction. Individual vertical movement of each of the head elements 160a, 160b, and 160c enables manipulator 142 to be configurable to match with each of the articles 12 at the first location 16 for pick up, and to be reconfigurable to match the manipulator 142 and the picked up articles 12 to the second location 17 prior to placing the articles 12 down thereon. Manipulator 142 can also place down articles on one location, and can pick up the same articles 12 from the same location.

Figure 3:
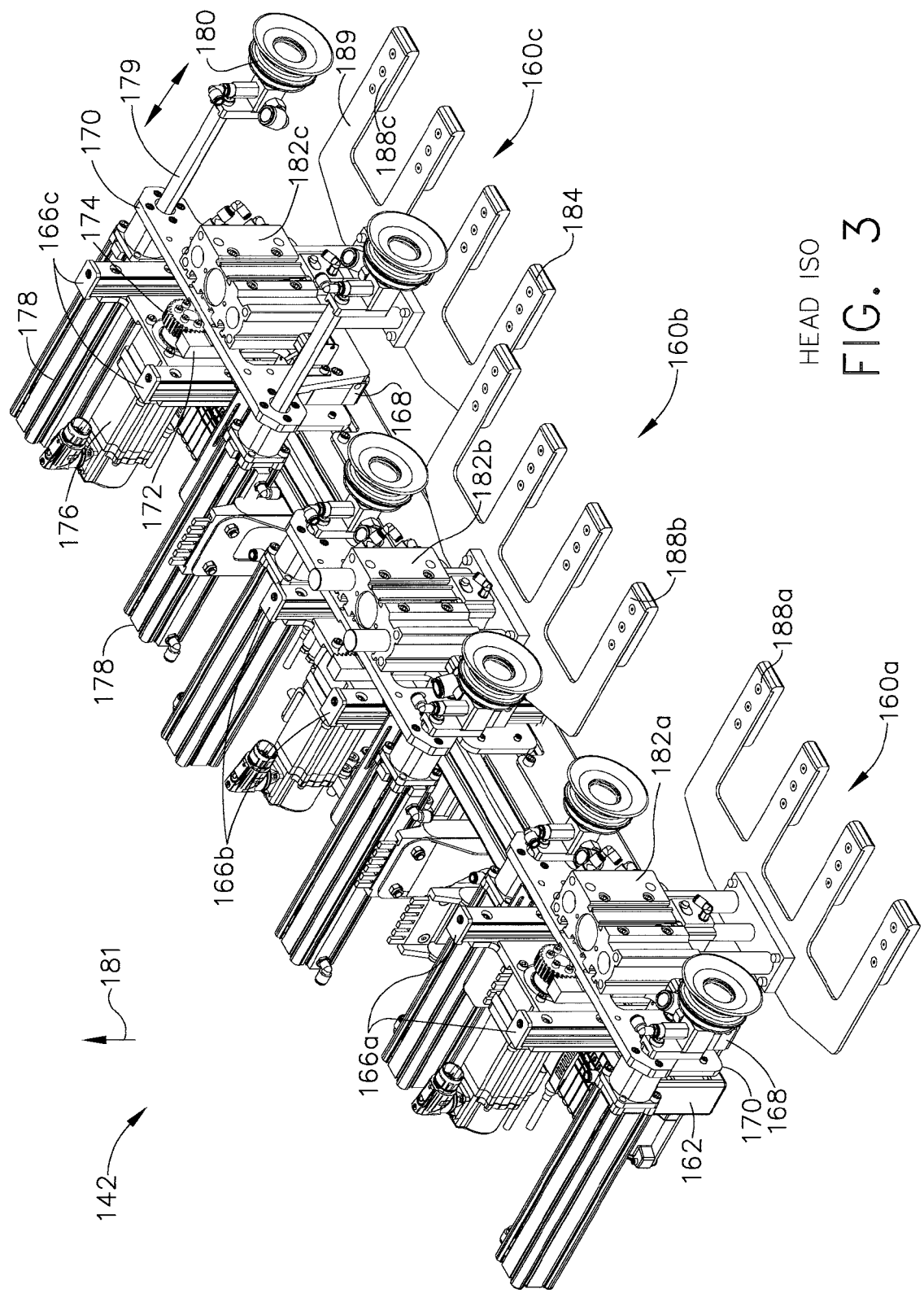
FIG. 3 illustrates a front isometric view of the configurable manipulator of FIG. 2.
Figure 4:
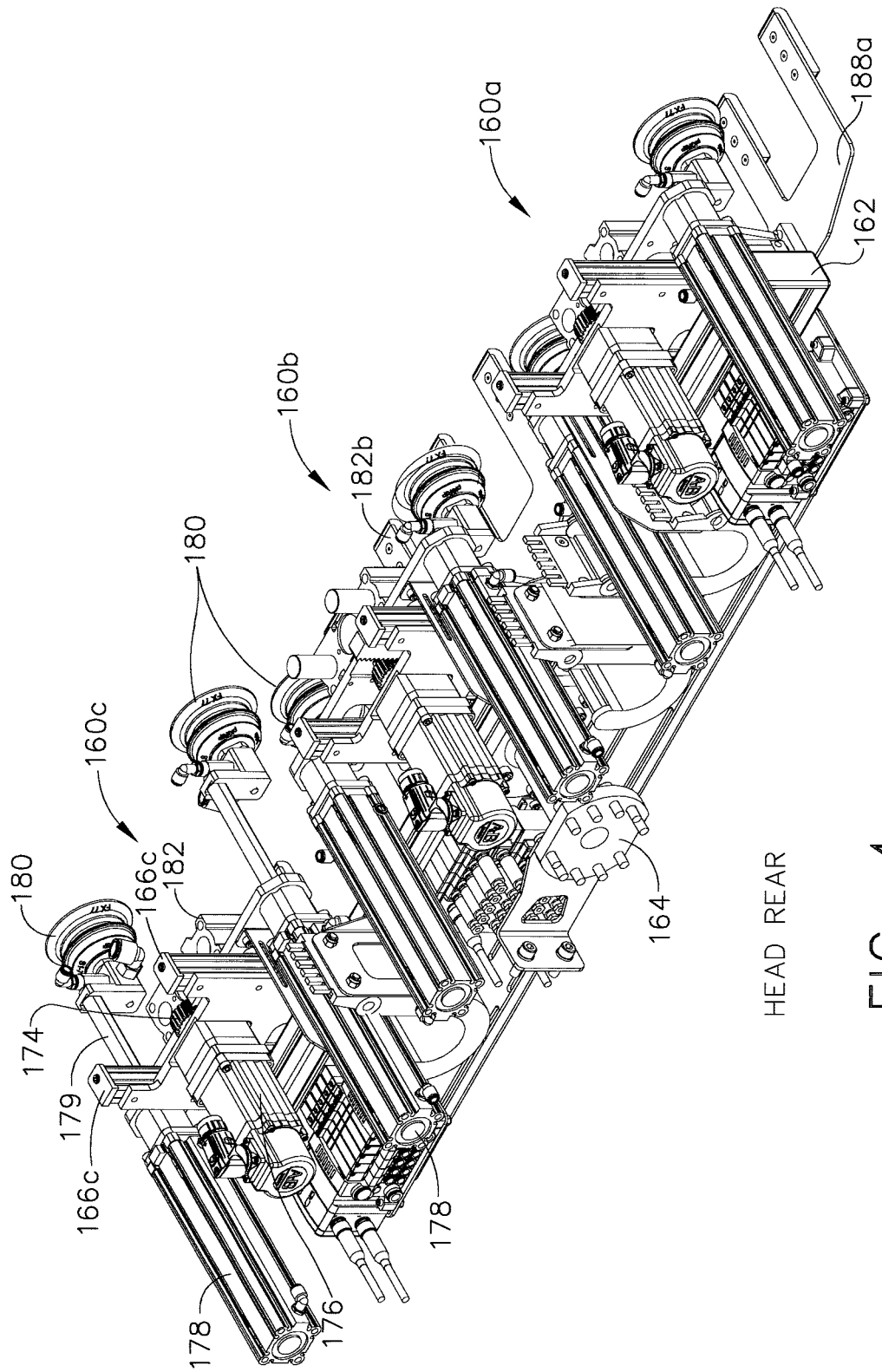
FIG. 4 illustrates a rear isometric view of the configurable manipulator of FIG. 3.
Figure 5:
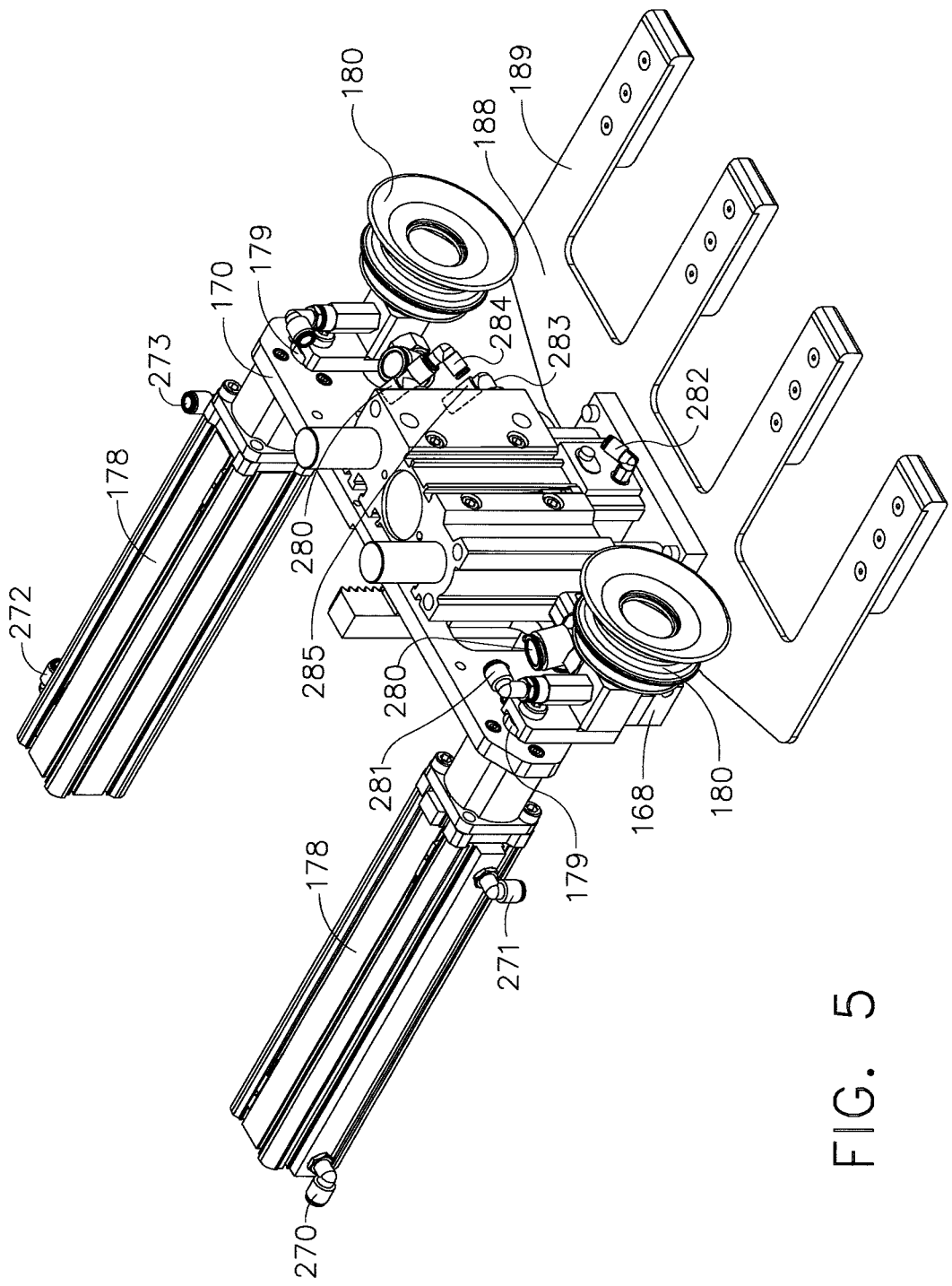
FIG. 5 illustrates a front isometric view of one of the individually movable head elements shown in FIG. 4.
Figure 5A:
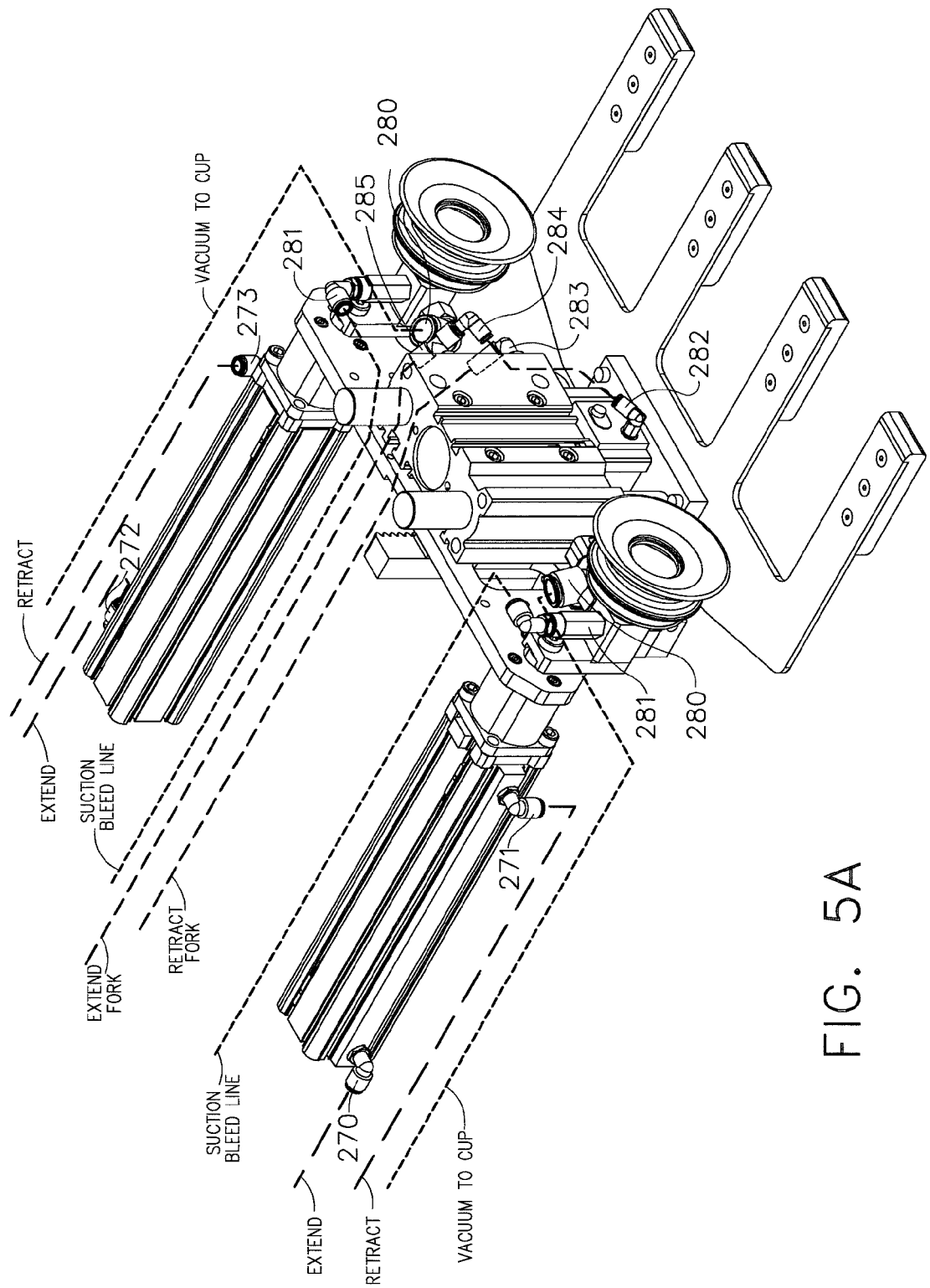
FIG. 5A illustrates the front isometric view of FIG. 5 with a schematic hose diagram.

One head element 160c will now be described in detail, and the description applies to all head elements 160a-c. Turning now to FIGS. 3-5, head element 160c has linear bearings 168 attached to a rear of front plate 170 to engage with and slide vertically on respective vertical guides 166c. A rack 172 is secured to a rear of the front plate 170, and engages with a gear 174 on drive motor 176. Drive motor 176 attaches to the cross member 162 and can drive head element 160c up and down vertical guides 166c. Drive motor 176 can be electric, can include a gear train, and may be used to move vacuum head 160c vertically up or down. When stopped or braked, drive motor 176 can also hold vacuum head 160c in a vertical position. Extension cylinders 178 attach to a rear of front plate 170. Each extension cylinder 178 is a conventional double acting cylinder, and each has a vacuum cup 180 attached to a front end of extendable and retractable rod 179. An alternate embodiment of a double acting cylinder 365 can replace double acting cylinder 178. Cylinder 365 delivers vacuum to the first port 280 of the vacuum cup 180 through the dual acting cylinder 365. The vacuum passes through a rear 378 of the dual acting cylinder 178a and then through a rear chamber 372 thereof through a coiled flexible hose 396. The coiled flexible hose 396 connects vacuum to the vacuum cup 180 through a bore 392 extending through extension rod 366 and the piston 370. This embodiment can be found in Provisional Application No. 61/985,417, entitled "DOUBLE ACTING FLUIDIC CYLINDER FOR MATERIAL HANDLING" filed Apr. 28, 2014 and assigned to the assignee hereof, the entire contents of each of which are hereby incorporated by reference in their entirety.

In FIGS. 3 and 4 vacuum cups 180 and rods 179 of head element 160a are shown extended from vacuum head 160c for illustrational purposes. Rear hose fittings 270, 272 connect to a rear chamber of each of dual acting cylinders 178, and front hose fittings 271, 273 connect to a front chamber thereof. An example of the chambers and internal components of a dual acting cylinder are shown in the cross section of shelf cylinder 182 of FIG. 6. While not identical in appearance, both work identically. Applying pressure to rear hose fittings 270, 272 pressurizes the rear chamber and extends rods 179 and vacuum cups 180 to the position shown by head element 160c in FIGS. 3 and 4. Applying pressure to the front chamber through front hose fittings 271 and 273 retracts the rods 179 and attached vacuum cups 180 to the position shown by head elements 160b and 160c in FIGS. 3 and 4. Both positive and negative pressure can be applied to each of the front hose fittings 271 and 273 and the rear hose fittings 270, 272. Electronics box 124 can control the timing and application of positive pressure, negative pressures and atmospheric venting to one or more chambers of extension cylinders 178. One example of this could be to ensure full extension or retraction of extension cylinders 178, the non-pressurized chamber should be vented to the atmosphere. Extension cylinders 178 are pneumatic, but are not limited thereto.

For example, when moving in to acquire a row 15 of articles 12 from an article pile 11, air at a positive 80 psi can be applied to rear hose fittings 270, 272 to rapidly extend rods 179 and attached vacuum cups 180 from the manipulator. Next, the pressure delivered to the rear hose fittings 270, 272 can be reduced to negative 5 psi which is not enough to retract the extend rods 179 and attached vacuum cups 180. When vacuum cups 180 on extended rods 179 contact articles 12 for pick up, the contact collapses the vacuum cups 180 and rods 179 rearward towards the manipulator 142. As will be described later, this can be useful to enable tines 189 of shelf 188 to contact the carton wall while maintaining contact with an article to be acquired.

A vacuum cup 180 attaches to the exposed end of each rod 179. Vacuum cups 180 are not coaxial with rod 179 but are offset below. Vacuum cups 180 further comprise a vacuum port 280 connected to vacuum side of air/vacuum pump 126, and a bleed line 281 to the pressurized air side of air/vacuum pump 126. Application of vacuum to vacuum port 281 enables vacuum cup 180 to attach to articles 12. Applying air to bleed port 281, when cup 180 is secured to an article 12, breaks the vacuum and kicks off or releases the article 12 from vacuum cup 180. Electronics box 124 may control the timing and application of vacuum and pressurized air or atmospheric bleed to the vacuum cups 180 with valves (not shown). One example of this can be the delivery of vacuum to the vacuum cups 180 to acquire the row 15 of articles 12 at the first location, to use vacuum to hold the row 15 of articles 12 while moving from the first location 16 to the second location 17, and followed by opening of the pressurized bleed line 281 to break vacuum at the vacuum cups 180. The application of pressurized air to suction cup 180 releases the row 15 of articles 12 from the vacuum cups 180 at the second location.

Figure 6:
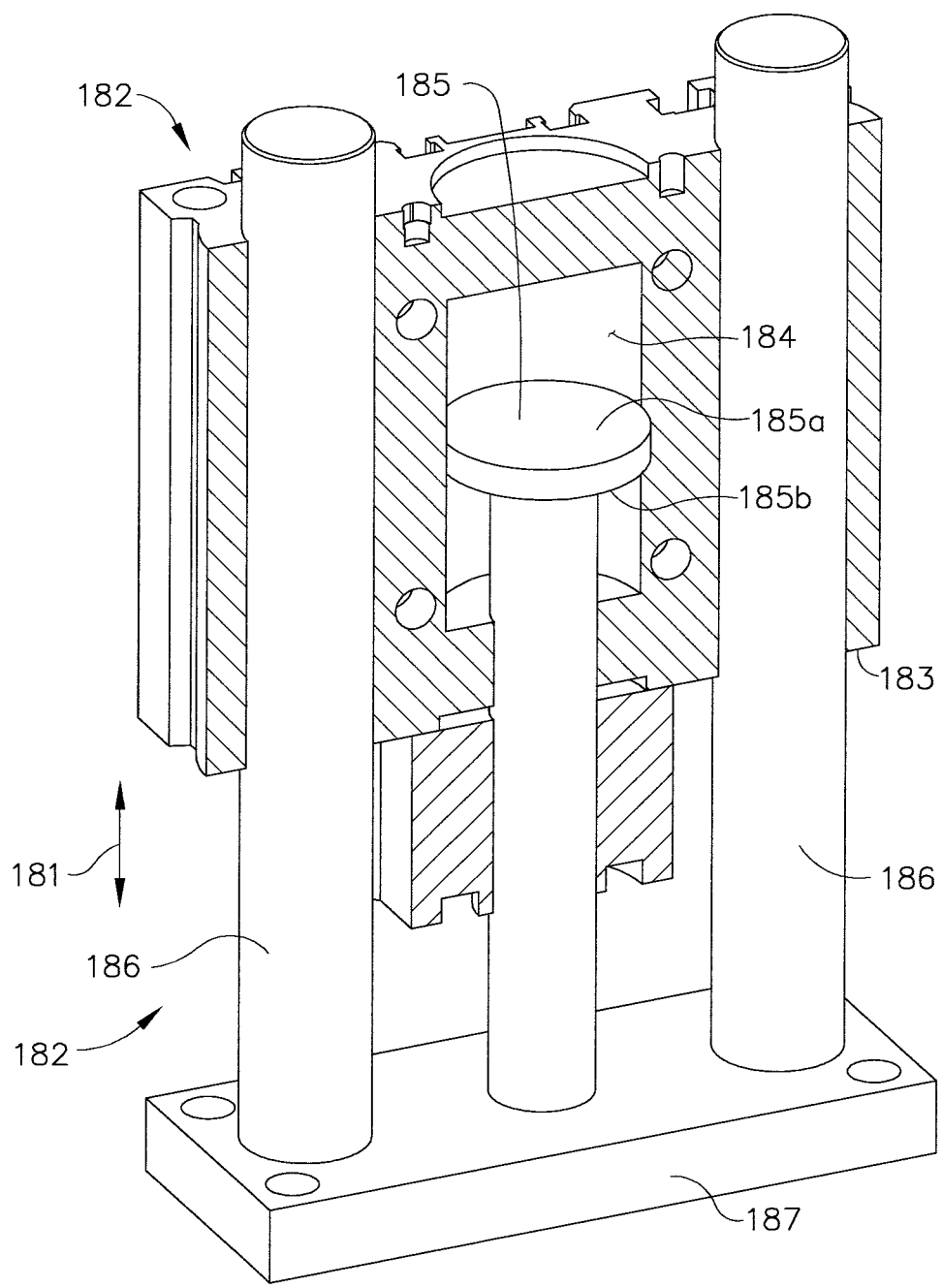
FIG. 6 illustrates a cross section of a shelf cylinder shown attached to a front of the individually movable head element shown in FIG. 5A.

Shelf cylinder 182 shown in FIGS. 3-6 attaches to a front of plate 170 and is a double acting cylinder movable up and down along the vertical direction 181 as shown in the cross section of FIG. 6. Shelf cylinder 182 comprises a cylinder block 183 with a vertically oriented center cylinder 184. A double acting piston 185 moves vertically within cylinder 184 and is connected to vertical guide shafts 186 by plate 187. Double acting piston 185 has a front chamber side 185b and a rear chamber side 185a. Double acting piston 185 moves up or down vertically in response to increasing pressure on rear chamber side 185a of piston 185 or on front chamber side 185b of piston 185. Pressure applied to rear chamber side 185a extends the shafts 186. Pressure applied to front chamber side 185b retracts shafts 186. Shelf 188 with tines 189 (FIGS. 3-5) attaches to plate 187 and moves up and down in response to pressurizing one chamber of double acting cylinder 182. In FIGS. 3 and 4, shelves 188a and 188c are shown fully extended downward in the vertical direction 181, and centrally located shelf 188b is shown retracted up. Tines 189 can act as a bumper configured to be pressed against the article pile below the one or more articles 12 being picked up or dislodged from the article pile 11 by the manipulator 142. Tines 189 can stabilize the article pile 11 below the one or more articles being dislodged or picked up. Shelves 188a-c can receive and support articles thereon. Shelves 188a-c are also configured to catch the one or more articles 12 as a row 15 picked up or dislodged from the article pile 11 and to guide or move the row of articles dislodged or picked up from the article pile 11 onto the body conveyor 130. As will be described later, shelves 188a-c can be used in different ways during loading and unloading.

Body conveyor 130 operates bi-directionally and attaches to mobile body 120 within reach of the robot arm 140. Body conveyor 130 moves articles 12 towards robot arm 140 during loading, and in the opposite second direction during unloading. The entire length of body conveyor 130 is shown in FIGS. 1 and 2. An exchange zone 134 is located at an end of the conveyor closest to the robot arm 140 to exchange articles 12 between the conveyor 130 and the robot arm 140. Exchange zone 134 can be the first location 16 for loading, and the second area 17 for unloading. During loading, a row 15 of articles 12 are picked up from the exchange zone 134 (first location 16 for loading) by the manipulator 142, and from there, manipulator 142 places the row 15 of articles 12 down in the trailer or truck 10 (second location 17 for loading). During loading, exchange zone 134 can act as an accumulator to accumulate incoming articles 12 into a full row 15 of articles 12 for pick up. During unloading, the row 15 of articles 12 are picked up from the trailer or truck 10 (first location 16) by the manipulator 142, moved, and manipulator 142 exchanges (places down) the row 15 of articles 12 onto the exchange zone 134 of conveyor 130 (second location 130). Manipulator 142 can also place down articles on one location, and can pick up the same articles 12 from the same location.

Figure 7:
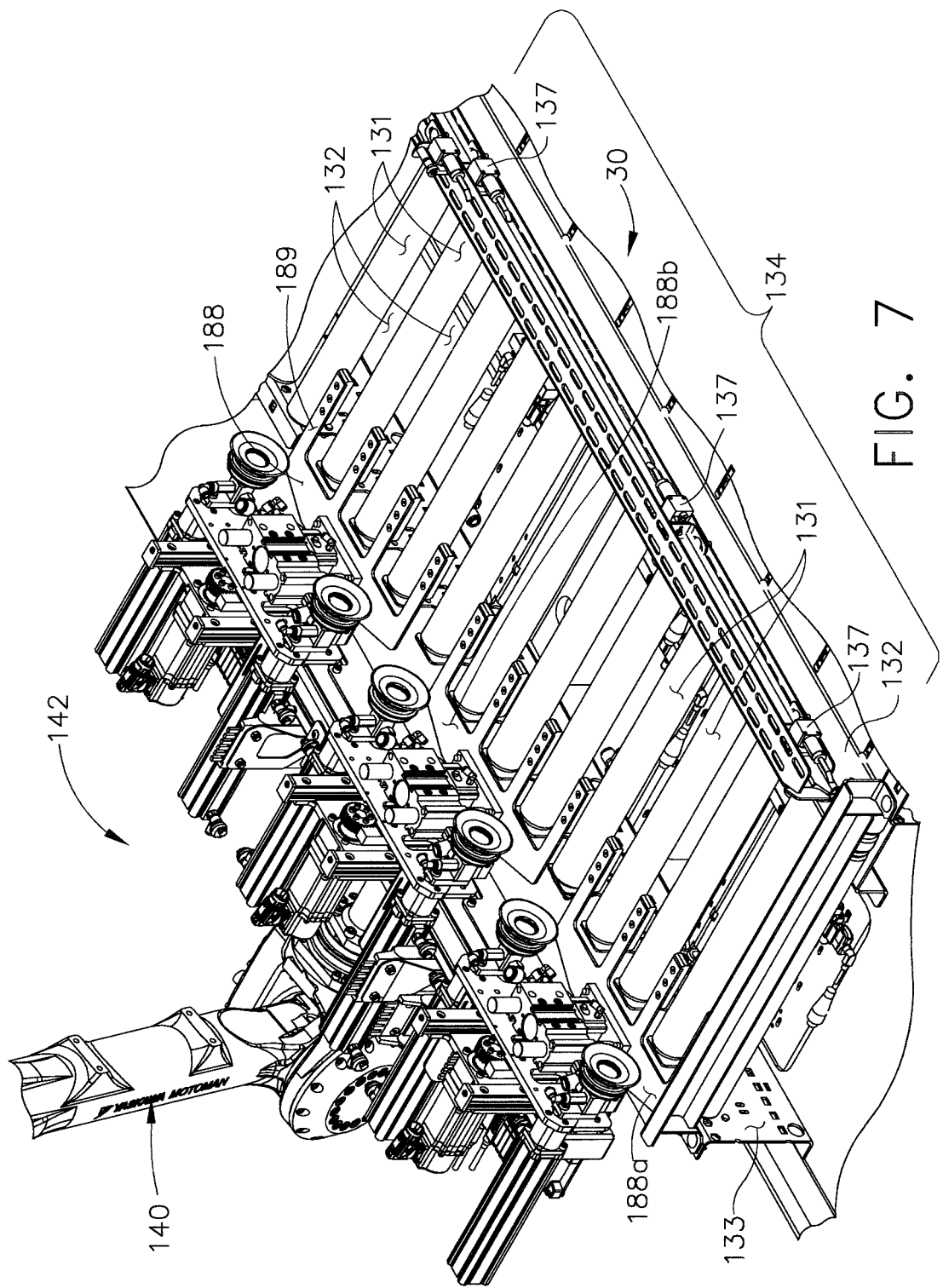
FIG. 7 is an enlarged isometric view of an exchange area of a body conveyor shown in FIGS. 1 and 2 with the manipulator positioned adjacent thereto.
Figure 8:
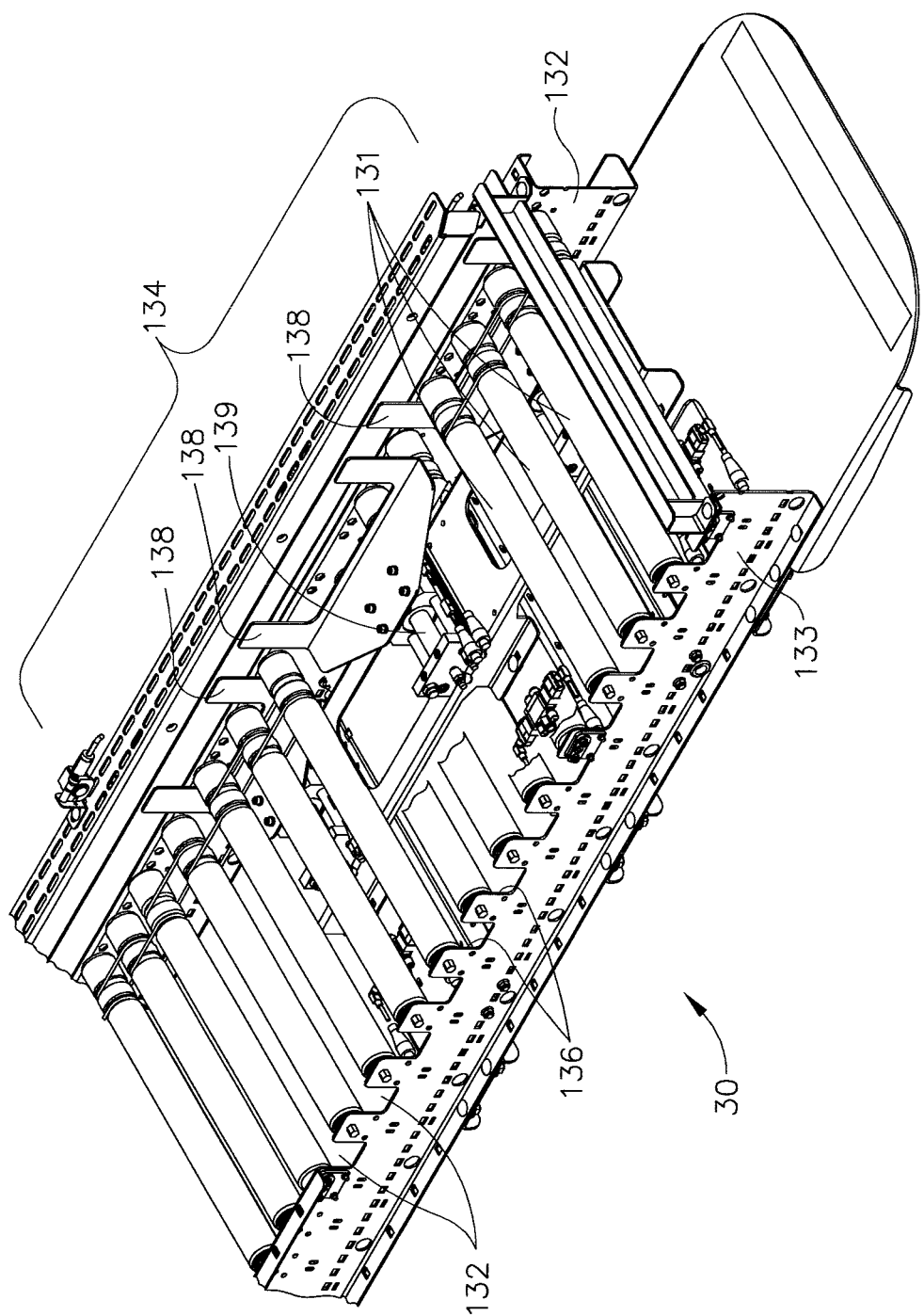
FIG. 8 is an isometric view showing the opposite side of the exchange area of FIG. 7 with a cut out area in rollers thereof showing a pneumatically movable fork extending between and under the sectioned rollers.

Turning now to FIGS. 7 and 8, body conveyor 130 can comprise rollers 131 supported by outer rail 132 and inner rail 133. Rollers 131 drive articles on conveyor 130. One or more of the rollers 131 can be a motor driven roller, and can drive non-motorized rollers with O-bands or belts. Or, body conveyor 130 can use any other suitable conveying drive to move articles therewith. In the exchange zone 134, rollers 131 are spaced apart with gaps 135 therebetween, and inner rail 133 includes cutouts 136 (see FIG. 8) at gaps 135. Gaps 135 and cutouts 136 are both sized to receive the tines 189 of manipulator 142 within and between. Tines 189 fit into gaps 135 without contact therebetween (see FIG. 7). Sensors 137 can sense if an article 12 is present, and can attach to outer rail 132. Rollers 131 can be used to move and position articles 12 in at least exchange zone 134 in response to signals from sensors 137.

FIG. 8 also shows several rollers 131 of the exchange zone 134 sectioned to reveal a plurality of loading forks 138 extending up between gaps 135 between rollers 131. Each loading fork 138 is operatively attached to a respective fork ram 139 underneath the rollers 131 and each fork ram 139 can be operated individually and pneumatically. Fork rams 139 move the extended portions of loading forks 138 along the gaps 131 from outside frame rail 132 towards inner frame rail 133. Fork rams 139 can be reversed to pull loading forks 138 against outer rail 132 after loading manipulator 142.

Figure 9:
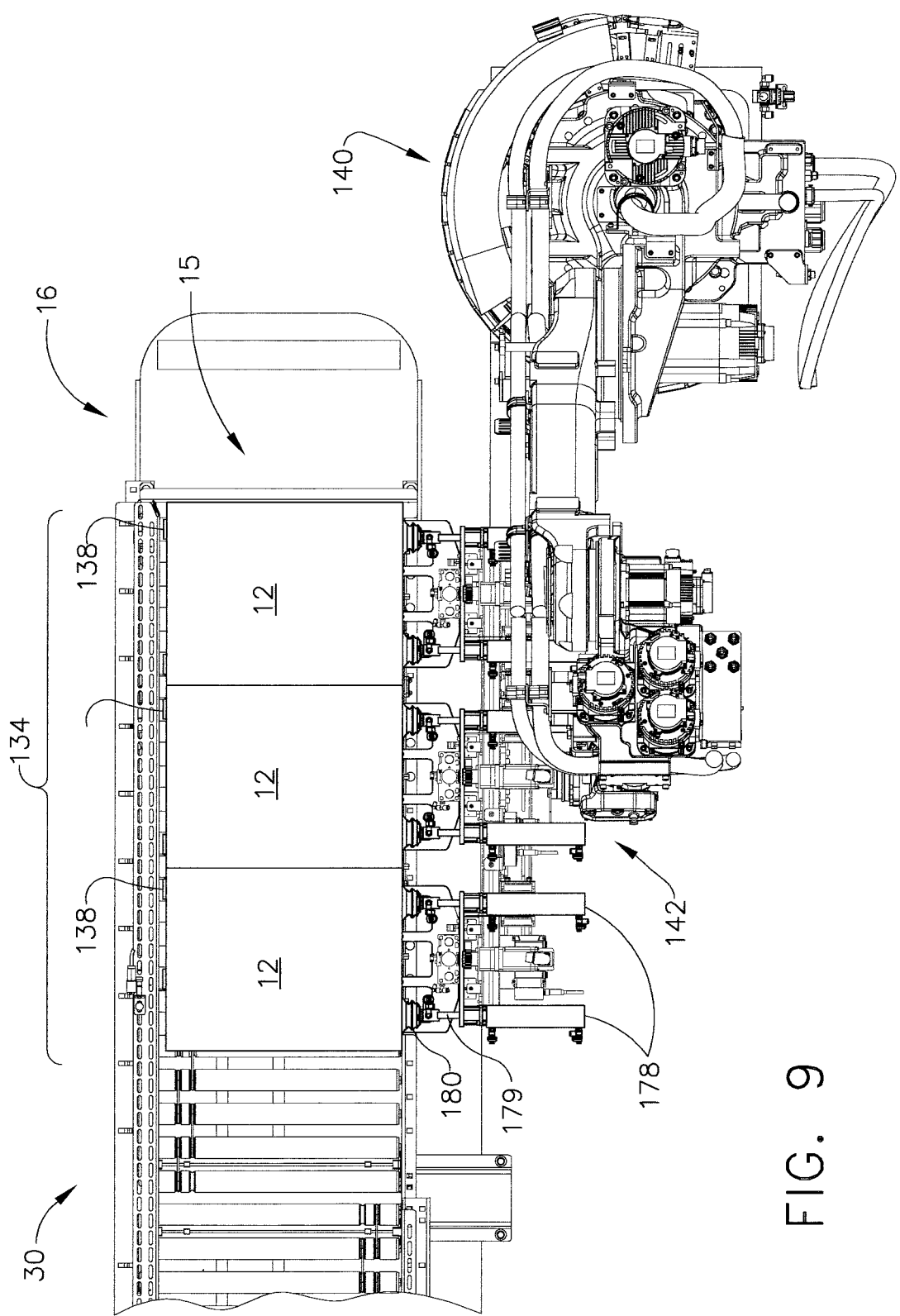
FIG. 9 is a top view showing the exchange area of FIG. 8 with articles thereon being moved onto the manipulator with the movable forks.

In FIG. 9, articles 12 are in the pick up or first position 16 and ready to be unloaded from the exchange zone 134 with manipulator 142. Robot arm 140 has configured each head element 160a-c to a horizontal position to match a bottom of each article 12 of row 15 supported on body conveyor 130. Robot arm in this view is swinging manipulator 142 towards the pick up position shown in FIG. 7, and the tines 189 of shelves 188 are moving under the row 15 of articles 12. Fork rams 132 are moving loading forks 138 and the row 15 of articles 12 towards the manipulator 142. The suction cups 180 and rods 179 were extended prior to contact with articles 12 by air at a positive pressure of 80 psi applied to rear hose fittings 270, 272. Also prior to contact, the pressure was reduced to a negative 5 psi which is low enough to prevent rods 179 from moving yet enabling rods 179 to retract from the contact of the vacuum cups 12. Additionally, vacuum can be applied to the vacuum cups 180 prior to contact with articles 12. In one embodiment, electronics box 124 can connect to front hose fittings 270 and 272 can include an anti-crush feature 300 that prevents crush damage to articles 12 when the suction cups 180 contact the article 12 and the manipulator is moving towards the articles 12. The anti-crush feature 300 turns off the pressurized air exchange with rear hose fittings 270, 272, and when the vacuum cups 180 make contact with the articles 12, the anti-crush feature prevents damage to the articles 12 during pick up. The anti-crush feature 300 engages after the rods 179 and vacuum cups 180 are extended and while the manipulator 142 is moving towards the articles 12 identified for pick up. When the vacuum cups 180 contact the articles 12, the contact independently retracts the rods 179 into the moving manipulator 142 to prevent crushing the articles 12. The anti-crush feature 300 also ensures that when an uneven row 15 of articles 12 present uneven, concave, staggered or angled front faces 112f to the vacuum cup 180 and approaching manipulator 142, the rods 179 are individually retracted to different extensions from the contact of the vacuum cups 180 with the uneven front faces 112f. As manipulator 142 move towards the position shown in FIG. 7, the shelves 188 and tines move under the row 15 of articles 12. Once manipulator 142 is at the position shown in FIG. 7, the row of articles 12 are ready for pickup from the exchange zone 134, which for loading, can be the first position 16. The anti-crush feature is shown in action in FIG. 9 and in FIGS. 16-18.

Figure 10:
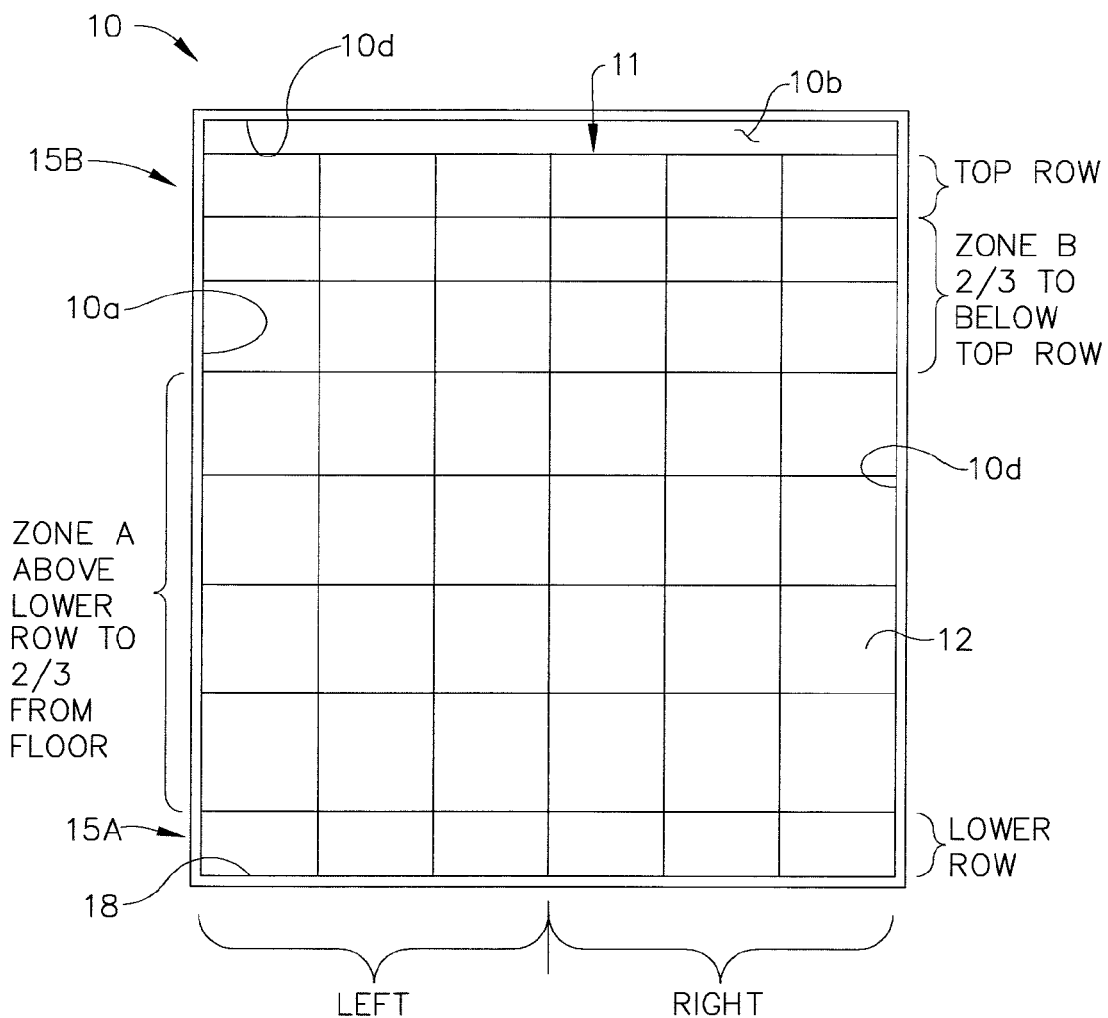
FIG. 10 is an end view of a front of a fully loaded truck trailer of FIG. 1 showing a floor to roof article pile and zones and sides thereof.

FIG. 10 is an end view of a standard sized trailer of truck 10 with an article pile 11 extending from wall to wall and from floor to near ceiling and represents the image taken by the least one vision camera 127 and used by the system control box 124 to determine an appropriate loading or unloading sequence based on loading and unloading logic and rules. FIG. 10 illustrates the sides and zones used by the system control box 124 that may affect the loading and loading procedures in each zone and side. These differences will be described along with the motions in detail below.

Article pile 11 comprises full rows 15a of articles 12 extending horizontally across a width of the truck with each full row 15a comprising six articles 12. Articles 12 in each full row 15a are shown as having the same height, and different full rows 15 can have different heights. Manipulator 142 of the present innovation may manipulate articles 12 as rows 15 of three, and it may take two loads 15 delivered by manipulator 142 to make one full row 15a extending wall to wall across the truck 10 (see FIG. 12A). Since each row 15 is one half of the width of the truck 10, each row 15 of three articles 12 is picked up or placed down on one of a left side or a right side of the truck 10. In the present innovation, trucks 10 may be loaded left to right and floor to ceiling as shown in FIGS. 11-15. Trucks 10 may be unloaded left to right or right to left depending on the mix of articles of different height in the article pile and the determination of an appropriate unloading sequence with the best results. The steps of unloading an even row 15 of same sized articles 12 is shown in FIGS. 16-24, and the unloading of mixed uneven rows is shown in FIGS. 25-29.

In the vertical direction, carton pile 11 has four vertical zones, a lower row, a top row 15b, and a zone A, and a zone B therebetween. Each one of the four zones requires a slightly different picking or placing procedure, and differs depending on whether it is the right side or the left side. An arbitrary dividing line is used by the system control box 124 and extends horizontally between zone A and zone B at a height of about ⅔ of the height of the truck 10. Below the ⅔ line and above the lower row, a procedure can have the robot arm 140 angled down to pick or place rows 15. Above the ⅔ line, the robot arm 140 can have procedures to work within the confines of the truck 10. For example, the robot arm 140 angles upwards above the ⅔ line to avoid contact with a roof 10d of the trailer. Each different procedure will be described below. Lower row and top row have loading and unloading procedures that are different than zone A and zone B. For loading, the lower row is the first full row 15a of a carton pile 11, and the top row is the last row 15 loaded. For unloading, the top row is the first row unloaded and the lower row is the last full row 15 unloaded.

Loading is done in article piles 11 one article 12 deep that comprise full rows 15a of articles 12 laid down from the floor 18 to the roof 10b. Once one article pile 11 is laid down one article 12 deep, the autonomous loading unloading device 100 backs up and begins laying a new floor to roof article pile 11 in front of the first one. This process continues until the truck is loaded. Turning to loading procedures, the loading procedure begins with FIG. 9 wherein a row 15 of side by side articles 12 are shown shortly before being loaded onto manipulator 142 at exchange zone 134, which for loading is the first location 16. From exchange zone 134 on body conveyor 130, the row of articles 12 are secured to manipulator 142 by vacuum cups 180 and supported from underneath by raising shelves 188a, 188b, and 188c into contact with a bottom of a respective article 12. Once the row 15 of articles 12 is grasped and secured, the robot arm and manipulator move to the position shown in FIG. 11.

Figure 11:
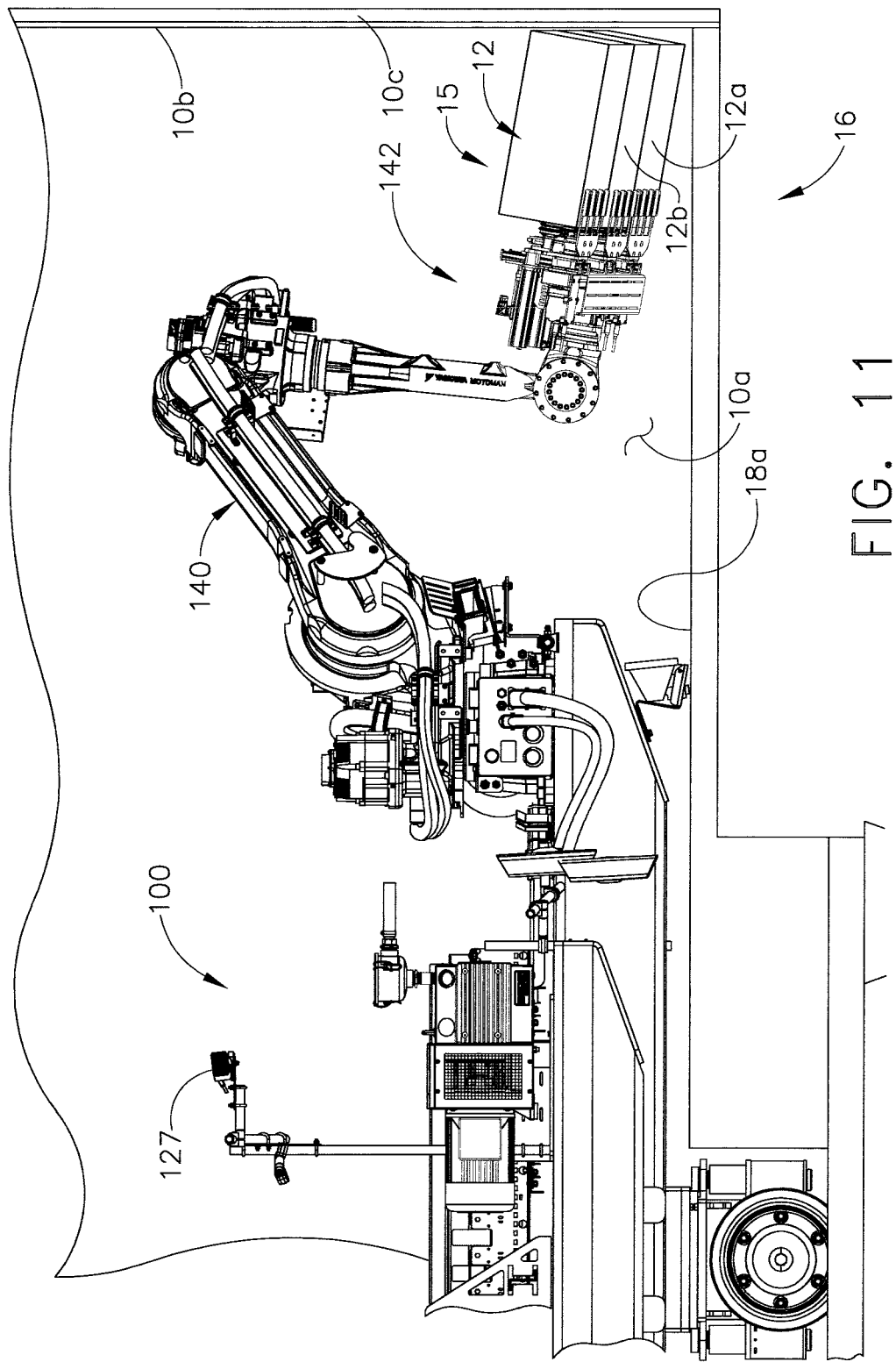
FIG. 11 illustrates a side view of the autonomous truck loader unloader of FIG. 1 in a truck and placing down a first row of articles onto a left side of a floor of the truck.

In FIG. 11, the robot arm 140 is swinging the first row 15 of articles 12 towards the left side of the floor 18a (second position 17). The first row 15 will be placed on the left side of floor 18a adjacent to a left wall 10b of truck 10. As shown, the robot arm 140 is rapidly swinging the manipulator 142 and the row 15 of articles 12 towards wall 10b. Before contacting the wall 10b, the row 15 of articles 12 and manipulator 142 are slowed and rotated to a position parallel to and above the floor 18. The robot arm 140 then tucks the row 15 of articles 12 into alignment, vacuum is broken in vacuum cups 180, and rods 179 extend to push the row 15 off of the shelves 188a-c and into position onto the floor 18a. While the row of articles 15 is being shoved off the angled shelves 188a-c, the manipulator 142 is moved back and up. Once the unloading is complete, the robot arm 140 and manipulator 142 returns to the exchange zone 134 for an additional row 15 of articles 12.

Figure 11A:
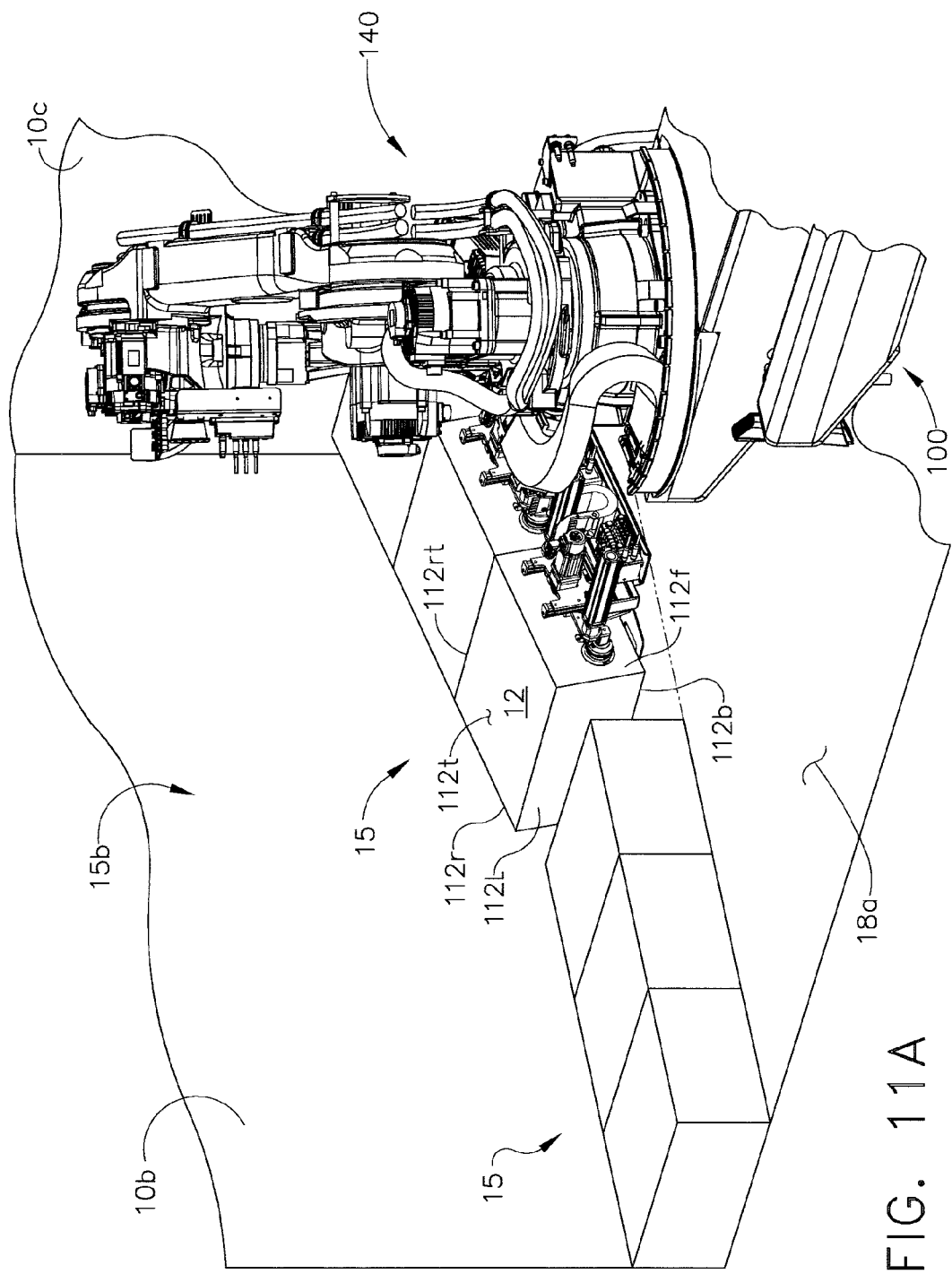
FIG. 11A illustrates an isometric view of the autonomous truck loader unloader of FIG. 11 in the truck and placing down a second row of articles onto a right side of a floor of the truck.
Figure 12:
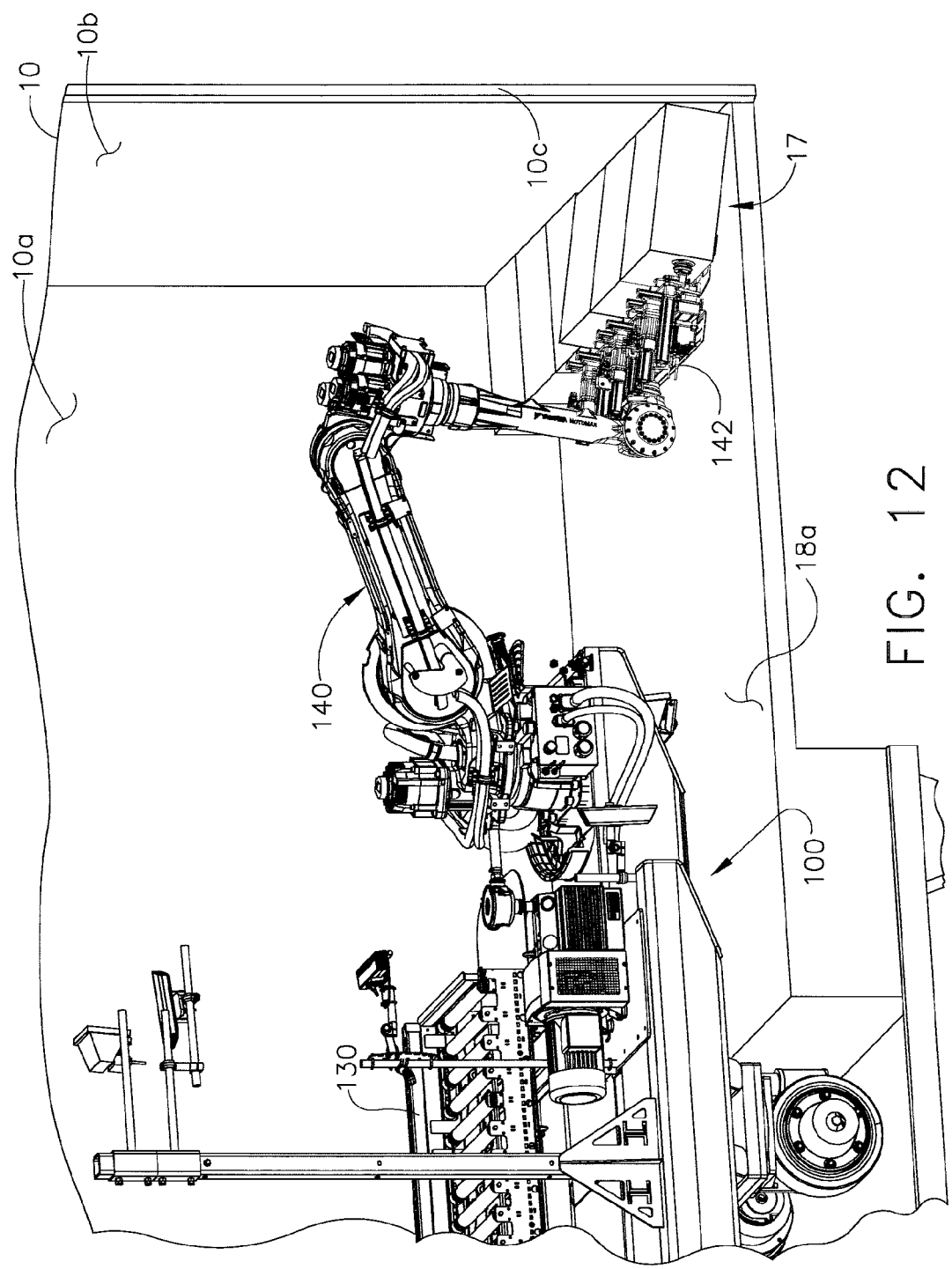
FIG. 12 illustrates another second isometric view of the autonomous truck loader unloader of FIG. 11A in the truck and placing down the second row of articles onto a right side of the truck.

FIGS. 11A and 12 shows the loading procedure for placement of the right row 15 of articles 12 into the lower right side of the lower row after the row 15 of articles were picked up from the exchange zone 134. As shown in FIG. 11A, the row 15 of articles 12 are brought in from the top with manipulator 142 holding onto a front face 112f of each article 12. The manipulator 142 and articles 12 are brought down canted at an angle to contact the first row 15 of articles 12 on the left side of the truck 10. The angled contact of face 112l exerts a wedging or biasing force against the left row 15. The wedging force reduces clearance between articles 12 of the left lower row 15 to ensure adequate space is available for the placement of the right lower row 15. Once adequate space is obtained for the load, the row 15 of articles 12 are straightened to be parallel with right wall 10c of trailer 10, and angled nose down as shown in FIG. 12. Rods 179 are then extended, vacuum is broken to vacuum cups 180, the manipulator 142 moves up and rearward, and the lower left row 15 is shoved into place off of shelves 188*a-c*. Once the unloading is complete, the robot arm 140 and manipulator 142 returns to the exchange zone 134 for a new row 15 of articles 12. In FIG. 11A, the faces of one of the articles 12 are identified as front face 112*f*, rear face 112*r*, bottom face 112*b*, top face 112*t*, left face 112*l*, and right face 112*rt*. These face notations can be used elsewhere.

Figure 12A:
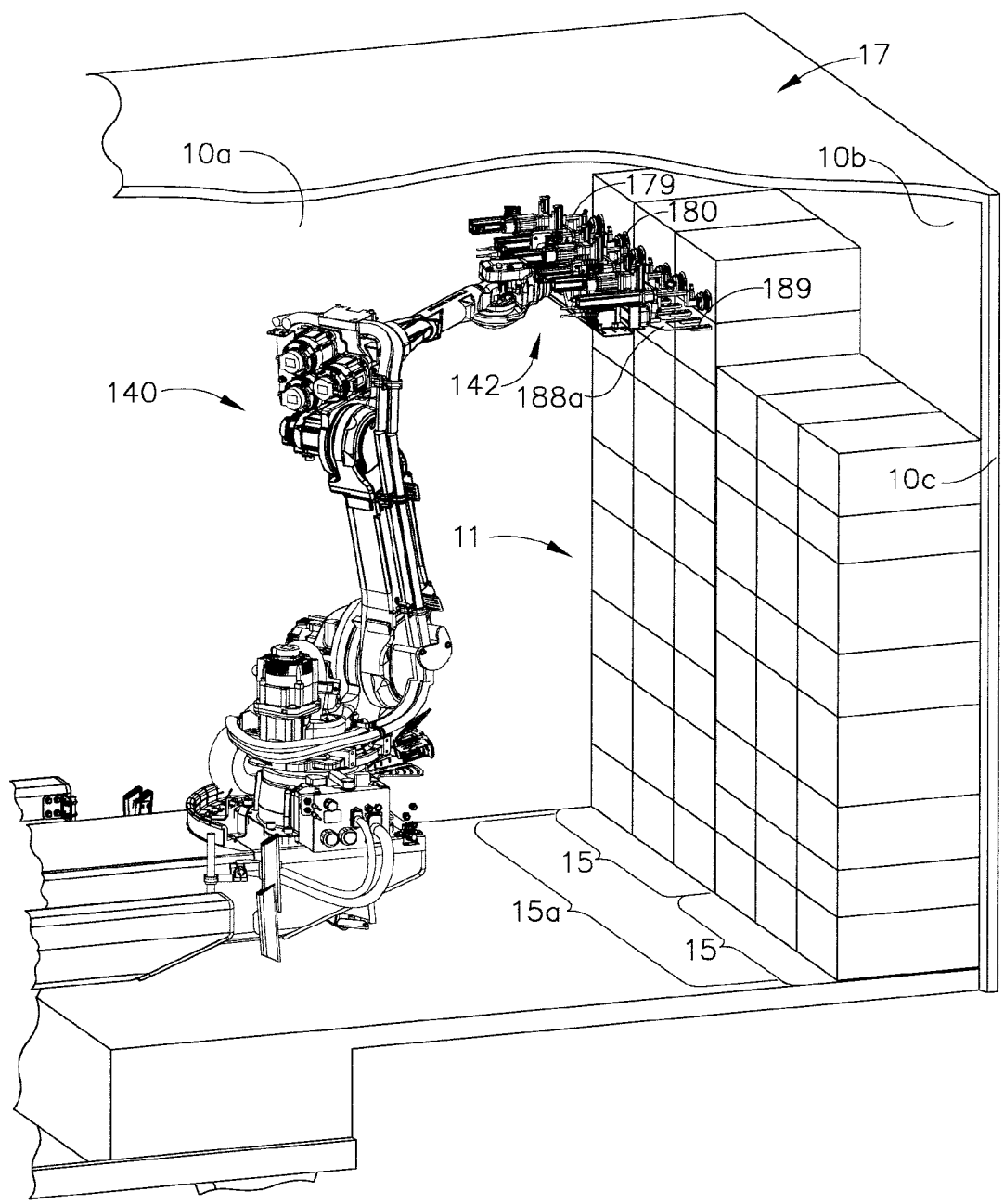
FIG. 12A illustrates an isometric view of the autonomous truck loader unloader of FIG. 12 in the truck and loading a row of articles onto a left side of the truck on top of an article pile.

Once the two rows 15 are loaded to create the lower row, the left side loading procedure changes above the lower row and below the top row. For loading rows 15 onto the left side of truck 10 below the top row, the robot arm 140 and manipulator 142 moves the left row 15 into a high and central position, and swings the row 15 of articles over towards wall 10*a* and down into position. The robot arm moves the manipulator 142 and row 15 forward to the position shown in FIG. 12A where the tines 189 of shelves 188*a-c* contact the row 15 of cartons 12 just below the placement location or second location 17. Once tines 189 are in contact, the rods 179 extend to push the row 15 of articles 12 into position, vacuum is broken to the vacuum cups 180, and manipulator 142 is pulled away from the newly placed left row 15. Rods 179, vacuum cups 180 and manipulator 142 retract to retrieve the next row 15 from body conveyor 130. Above the ⅔ line of FIG. 10, the robot arm 140 angles upwards as shown in FIG. 12*a*. Below the ⅔ line, the robot arm angles down (see FIG. 12) during placement of a row 15 of articles 12.

Figure 13:
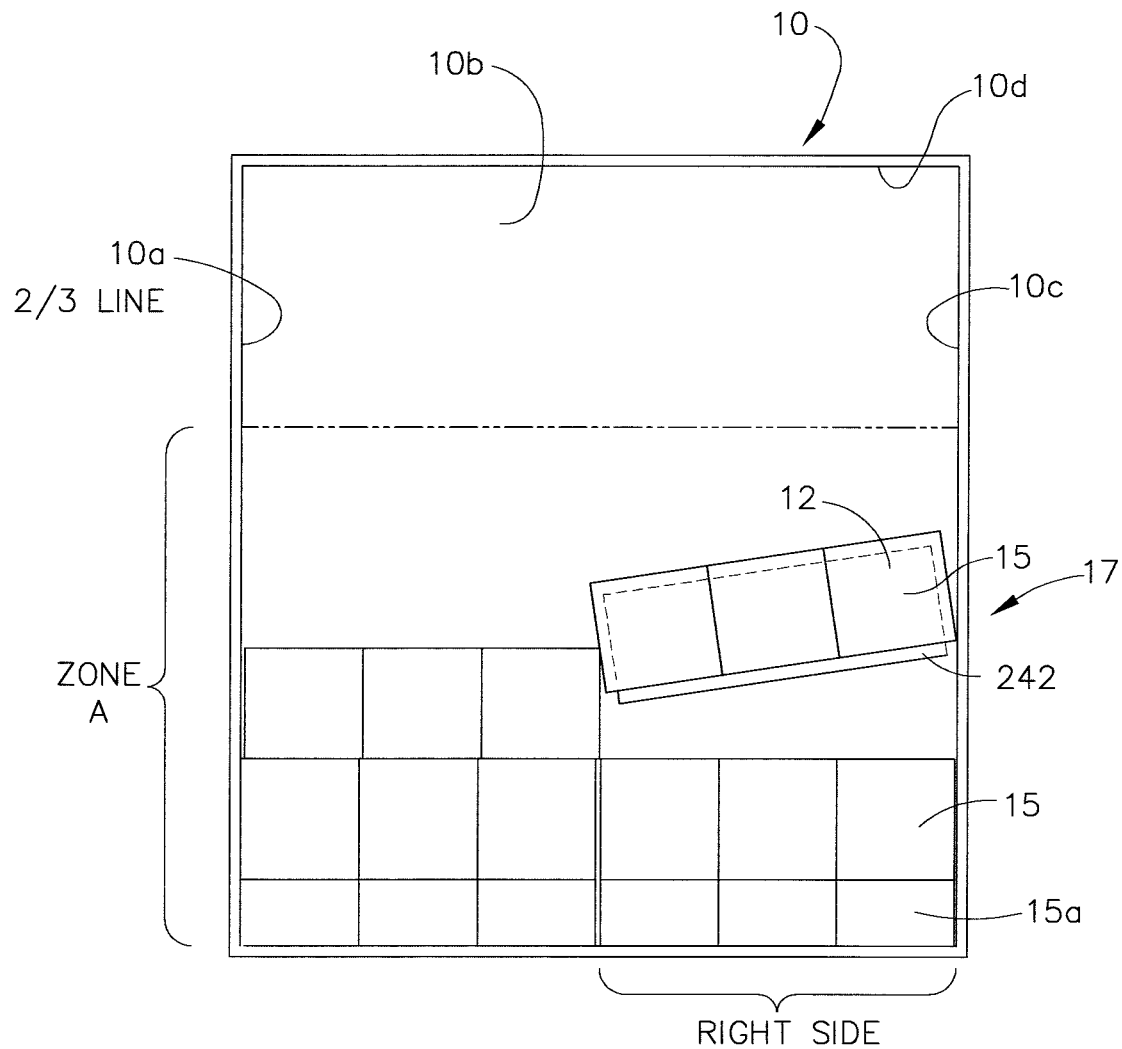
FIG. 13 illustrates a section view showing the front of the truck loader unloader of FIG. 1 and the manipulator loading a row of articles onto the carton pile at an angle to bias the left row of articles.

FIG. 13 is a view towards a front wall 10*b* of the truck 10 and shows the loading procedure where rows 15 are placed on the right side of truck 10. FIG. 13 applies to all rows 15 placed on the right side from on top of the lower row and up to the ⅔ line. In this view, manipulator 142 is shown schematically while bringing the articles 12 in from the top and rotated as shown to contact the left row 15 with face 121 of the left most article 12 on manipulator 142. As the right row 15 is brought down, the left row 15 is pushed or biased to the left to reduce clearance between articles 12 of the left row 15 and to ensure adequate space is available for the placement of the incoming right row 15. Once the adequate space is created, the manipulator 142 and row 15 rotate to be parallel to the floor, and move down and into the position shown in FIG. 12A. Once tines 189 are in contact, the rods 179 extend to push the row 15 of articles 12 into position, vacuum is broken to the vacuum cups 180, and manipulator 142 is pulled away from the newly placed right row 15.

Figure 14:
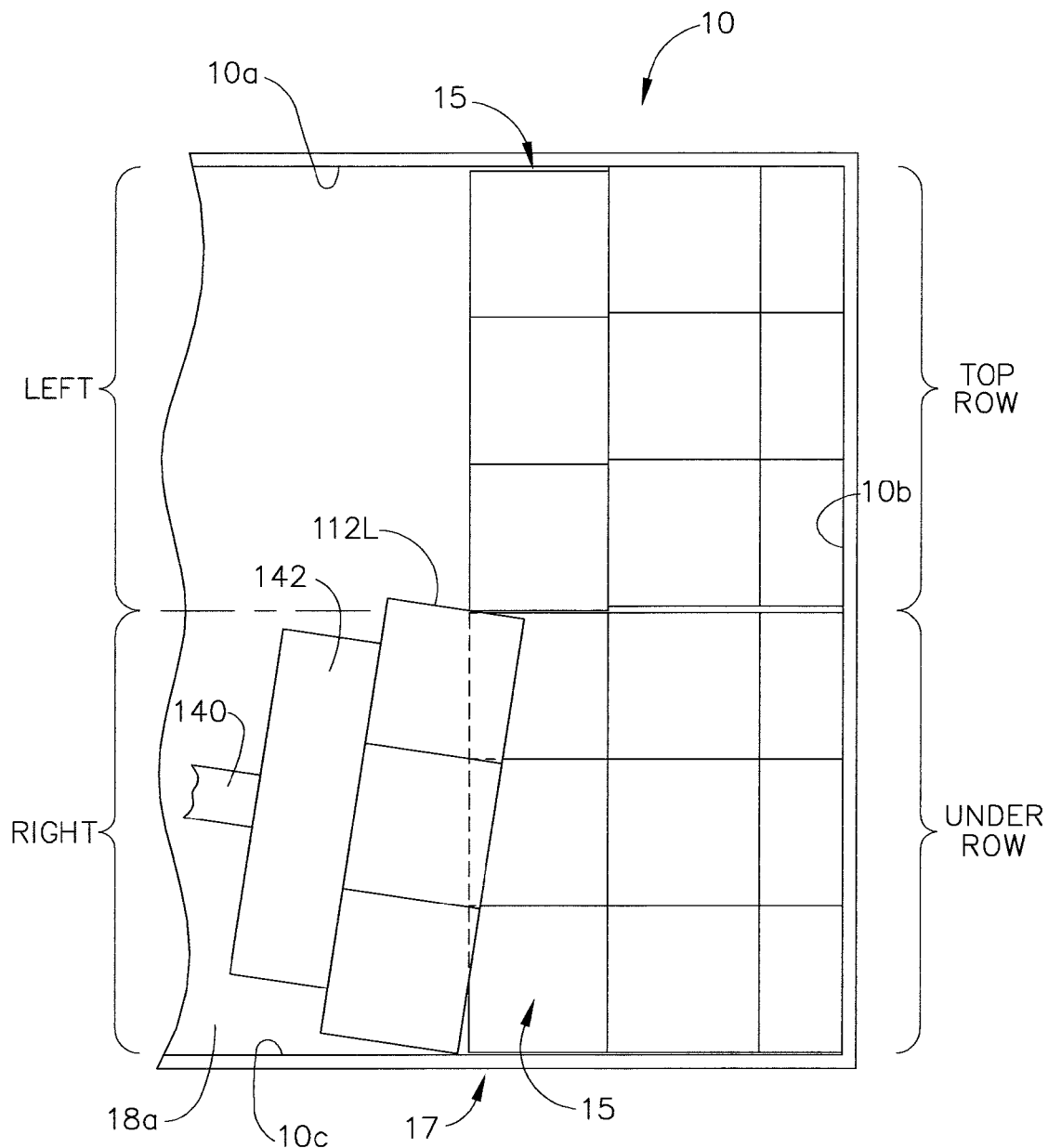
FIG. 14 illustrates a top section view of the manipulator and truck loader unloaded of FIG. 13 and showing the front of the truck and with the manipulator loading a row of boxes into a right side of the truck and biasing the left row of boxes to the left.

FIG. 14 illustrates a top view showing the loading procedure where a new row 15 is placed on top of a previously placed row 15 on the right side of the truck 10, and above the ⅔ line. Above the ⅔ line and including the top row, it is difficult to have sufficient clearance to wedge or bias the left row as shown in FIG. 13, so the bias procedure is altered as shown. In FIG. 14, the manipulator 142 and row 15 are held horizontally and cocked as shown. As the row 15 is moved into place, the cocking angle brings the left face 112 into contact with the left row 15 and places a bias force thereon. This creates the gap necessary to receive the right row 15. Once the gap is created, the manipulator 142 and row 15 are rotated to fit therein, and moved into the position shown in FIG. 12A where the row 15 is ready to be inserted and the manipulator 142 removed.

Figure 15:
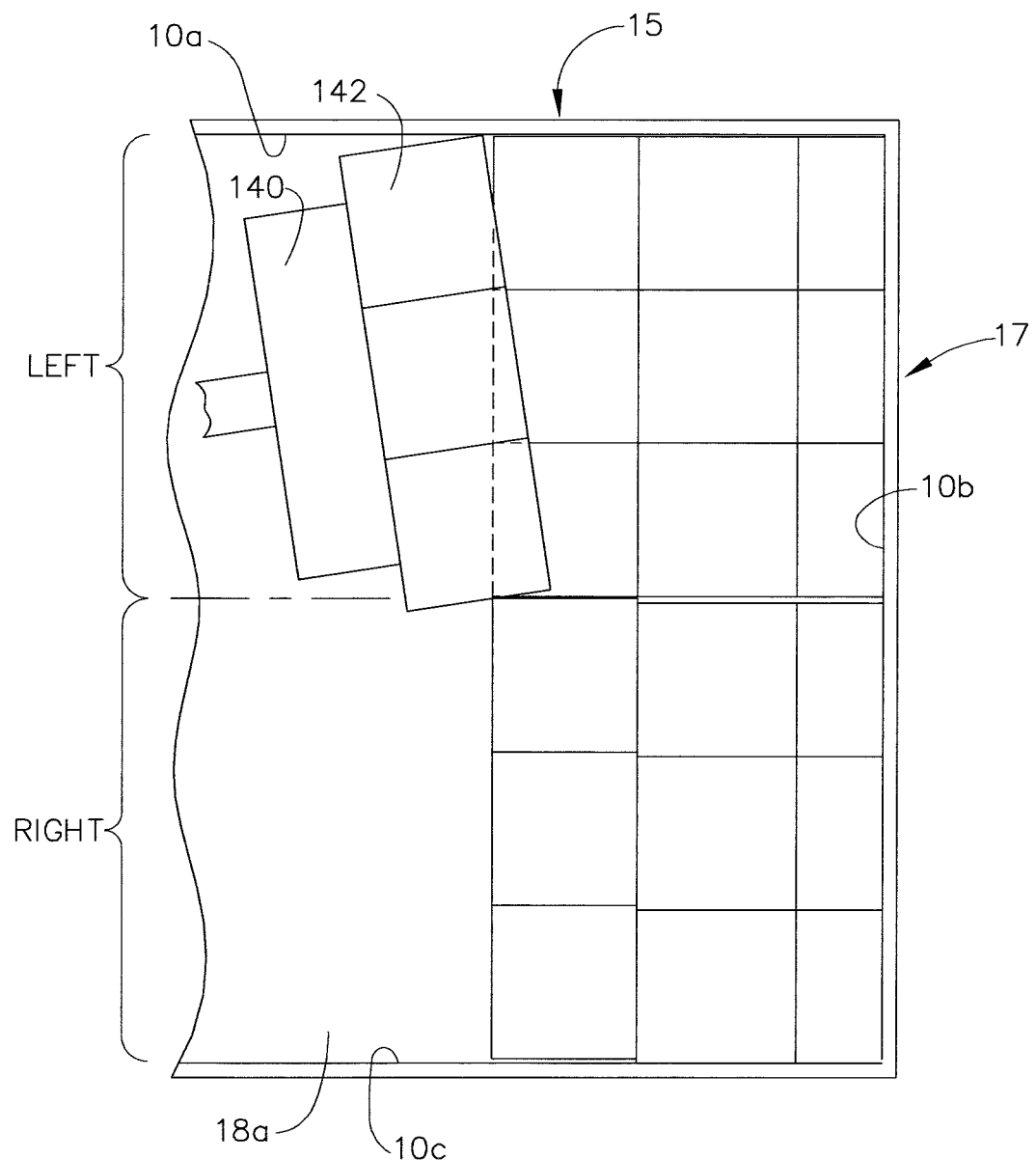
FIG. 15 illustrates the top section view of FIG. 14 showing the front of the truck loader unloader and with the manipulator loading a left row of boxes into a left side of the truck.

FIG. 15 illustrates a top view showing row 15 being held by manipulator 142 and being inserted into the left top row position at an angle as shown. The right top row has not been placed and the entire top row is empty. Row 15 and manipulator 142 are straightened out to the position shown in FIG. 12A, and row 15 is pushed into position with rods 15. Once row 15 is placed in position, the manipulator 142 is removed and returned to the exchange zone 134 for the final upper right row 15. The upper right row 15 is inserted as shown in FIG. 14 and with the same procedure described above.

The autonomous loading unloading device 100 can unload rows 15 from the article pile 11 from roof 10*d* to floor 18, 18*a*. Once that article pile 11 is unloaded, the autonomous loading unloading device 100 advances farther into the truck 10 a length of a left side 112*l* or right side 112*r* and unloads the next article pile 11 from roof 10*d* to floor 18, 18*a*. This process continues until the truck 10 is unloaded.

Figure 16:
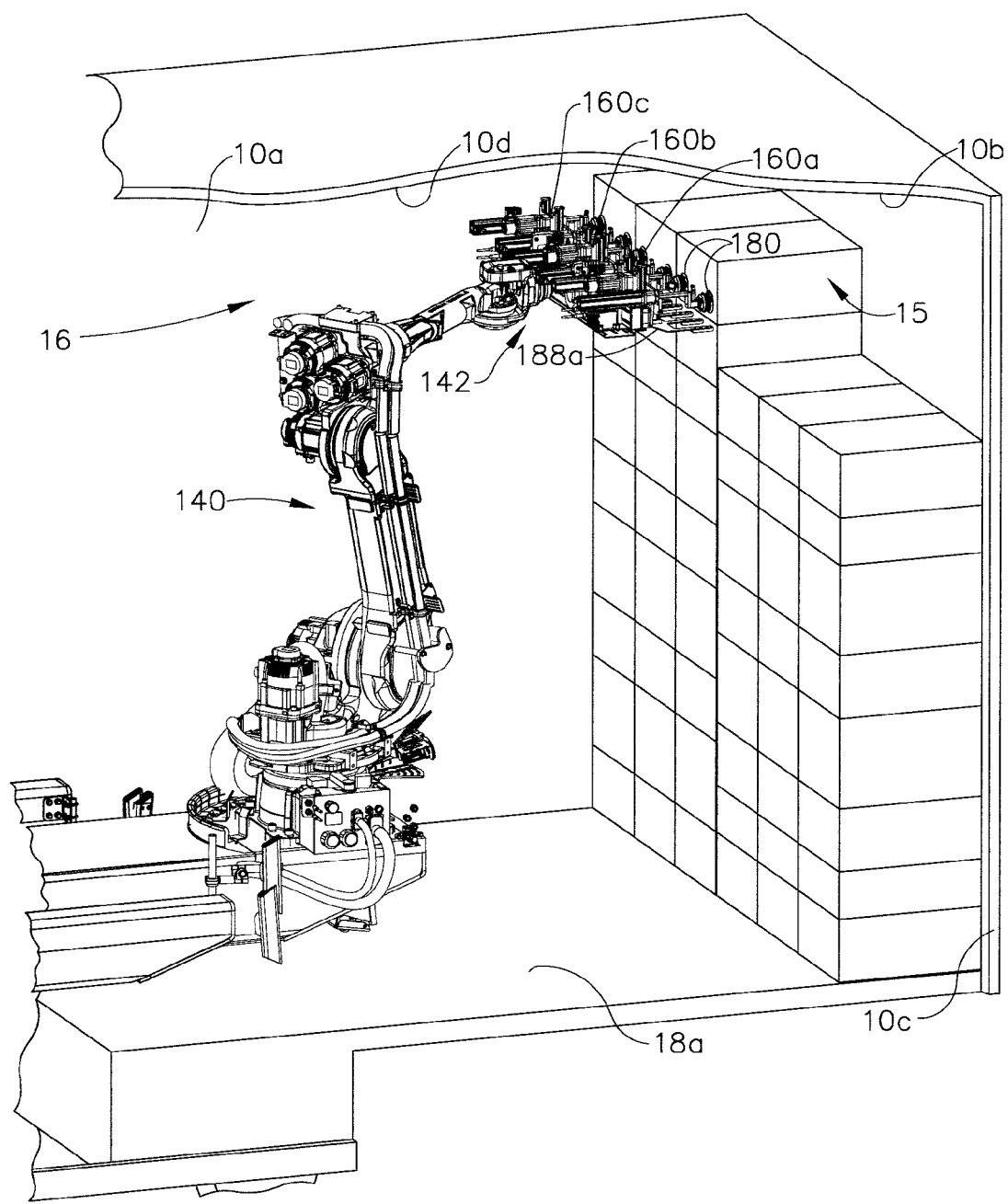
FIG. 16 illustrates an isometric view of the autonomous truck loader unloader of FIG. 1 in the truck and unloading a row of articles from a top of an even article pile in the truck.

FIG. 16 illustrates the robot arm 140 moving the manipulator 142 in towards the carton pile 11 just before contacting a row 15 of articles 15 with the vacuum cups 180. Based on the image taken with camera 127, the left upper row 15 is selected for removal. The row 15 of articles selected is a horizontal even row of same sized cartons 12, and the three individually movable head elements 160*a*, 160*b*, and 160*c* are configured to a horizontal configuration as shown to match the horizontal selected row 15 at the first position 16. Each of the individually movable shelves 188*a-c* is moved up to the raised position illustrated by shelf 188*b* in FIG. 3.

Figure 17:
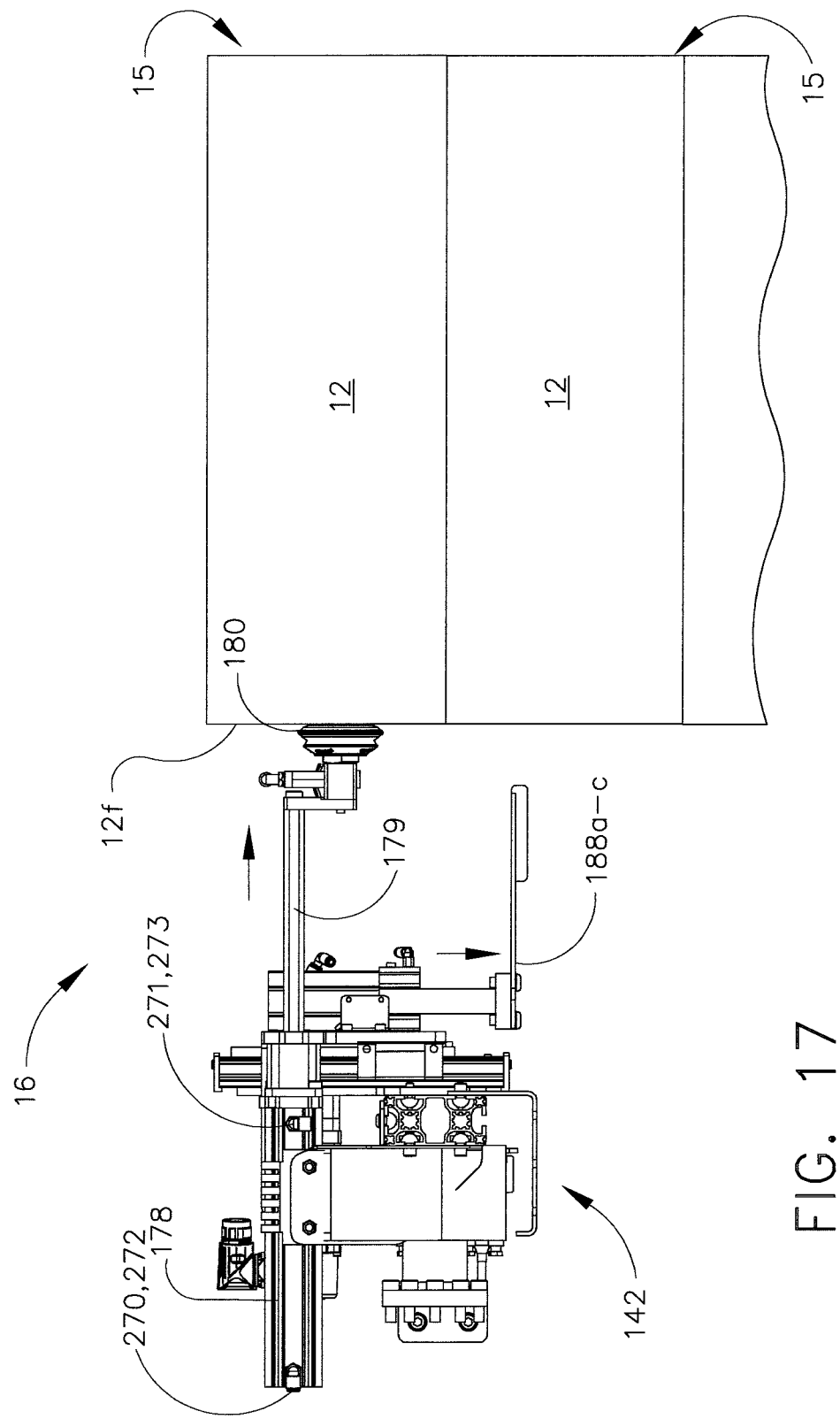
FIG. 17 illustrates a side view of the first step of unloading where the manipulator of FIG. 16 is moving towards the carton pile with the rods and suction cups fully extended.

As shown in FIG. 17, all of the suction cups 180 and rods 179 of manipulator 142 are being extended by applying a high positive air pressure of about 80 psi to each of the rear hose fittings 270 272 of each of the double acting cylinders 178. The front hose fittings 271, 273 are venting to atmospheric to enable the rods to move without compression resistance until the rods 179 are fully extended. After fully extending the rods 179 and the vacuum cups 180, the pressure to rear hose fittings 270, 272 may be reduced to about 5 psi and a pressure of 5 psi is applied to the front hose fittings 271, 273. Once all of the front and rear pressure fittings 270-273 are at 5 psi, the rear hose fittings 270, 272 may be vented to the atmosphere 179. When the manipulator 142 moves towards the articles 12, the vacuum cups 180 contact the selected row 15 of articles 12 on the front surfaces 112*f* thereof, and overcome the friction in the extension cylinders 178. Rods 179 retract from the contact and prevent crushing or damaging the articles 12. Vacuum can be applied to the vacuum cups 180 prior to contact with articles 12. In FIG. 17, the individually movable shelves 188*a-c* are all shown moved down along vertical arrow 181 to the downward extended position illustrated by shelves 188*a* and 188*c* in FIG. 3.

Figure 18:
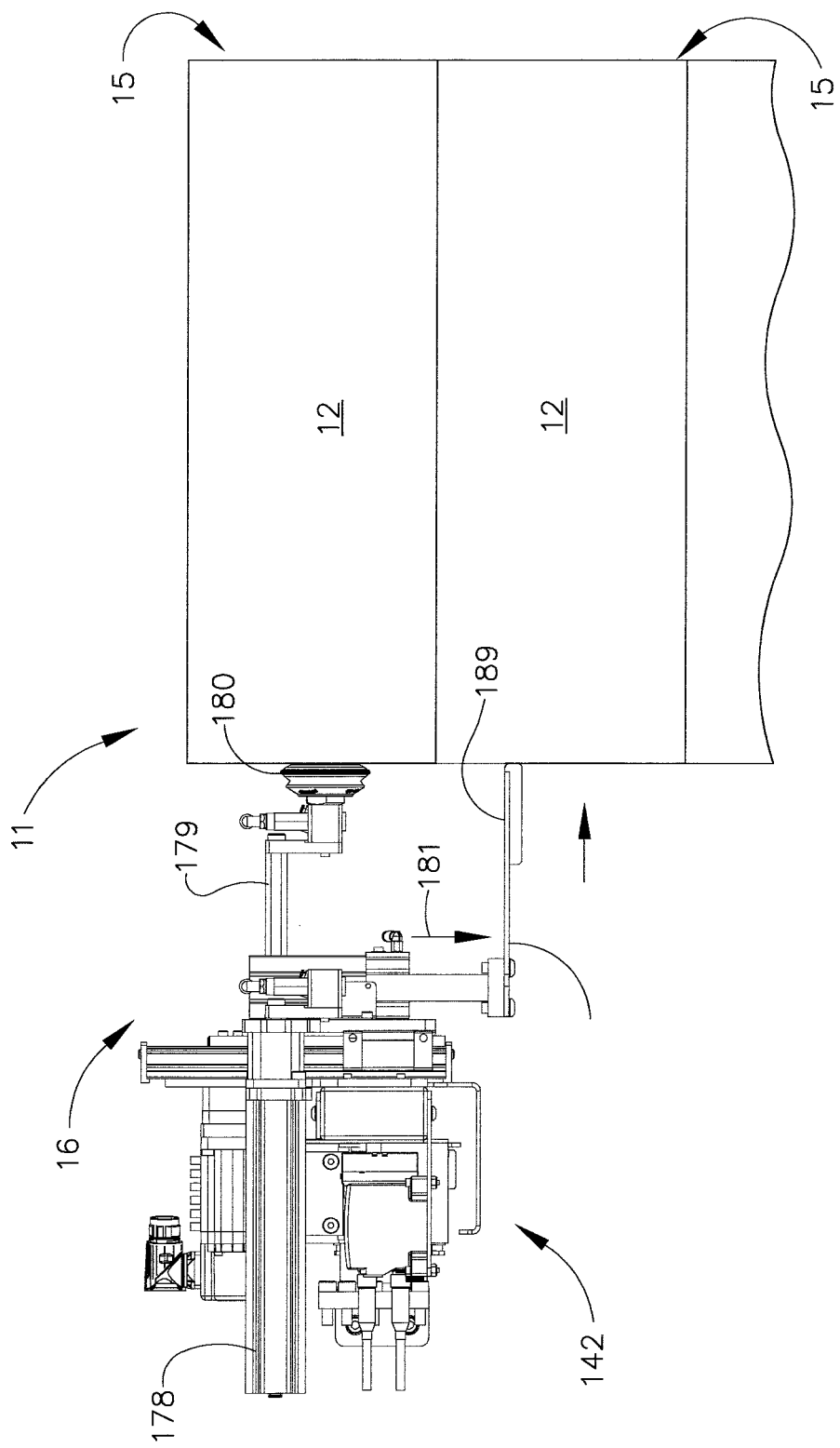
FIG. 18 illustrates a side view of the second step of unloading where the manipulator of FIG. 17 has moved towards the carton pile and the rods have retracted retracting from the contact, and shelves have contacted the article pile below the selected row of articles.

In FIG. 18, the movement of the manipulator 142 was stopped when the tines 189 of the shelves 188*a-c* contact the front faces 112*f* of the row 15 of articles 12 directly under the row 15 selected for removal. The stopping point may be determined from the snapshot or with a contact switch or sensor. The contact of the tines 189 with article pile 11 acts as a bumper to provide a retention force (see arrow below tines 189) that holds the wall of the article wall 11 in place during removal of the articles 12 from the article pile 11.

Figure 19:
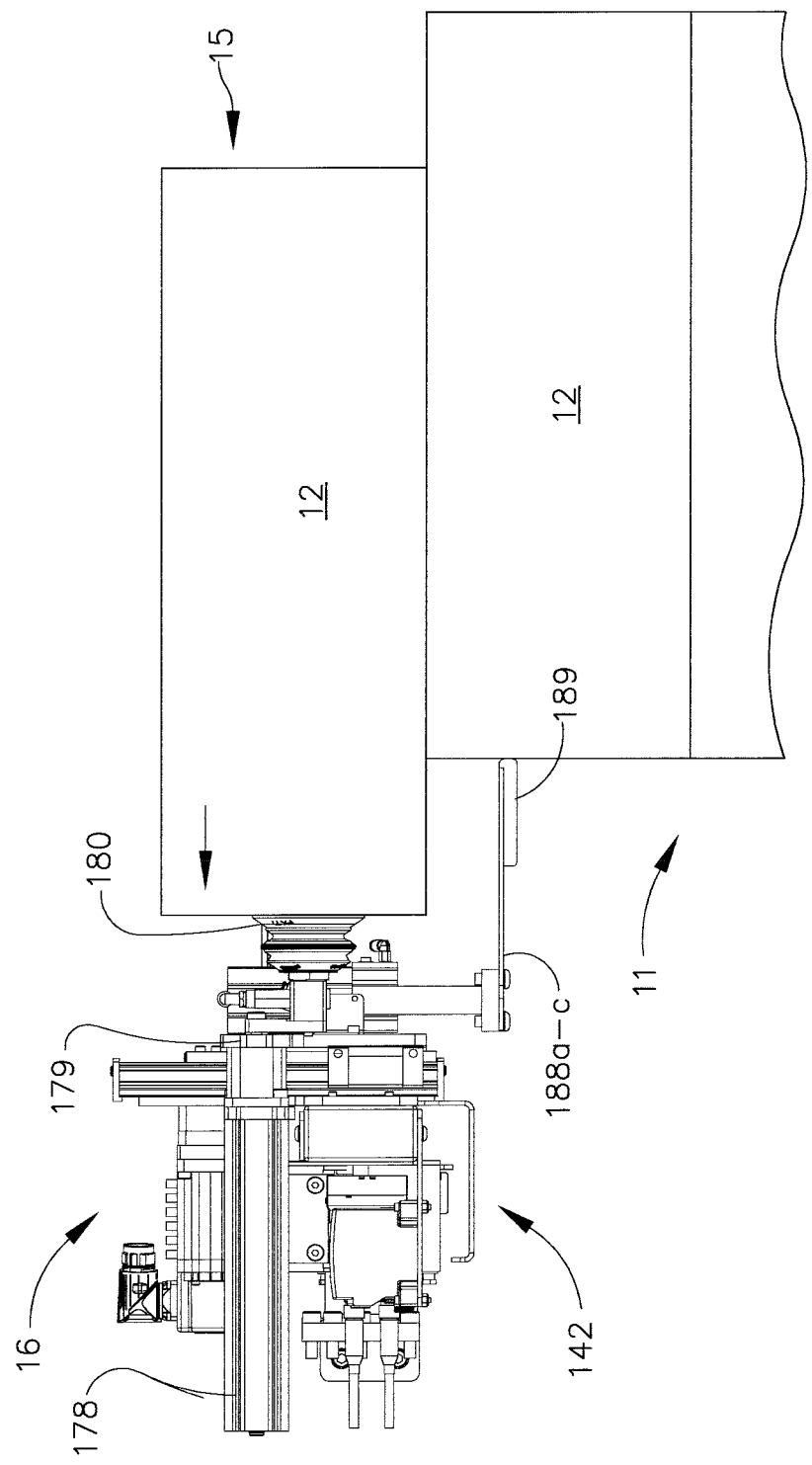
FIG. 19 illustrates a side view of the third step of unloading where the manipulator of FIG. 18 is stopped relative to the carton pile, and the rods and suction cups fully retracted to pull the row of articles partially off the carton pile.

As shown in FIG. 19, the article wall 11 is held in place with the bumpers or tines 189 while the rods 179 and cups 180 are retracted with high pressure air. The retraction of rods 179 and vacuum cups 180 drags the selected row 15 outward from the article pile 11.

Figure 20:
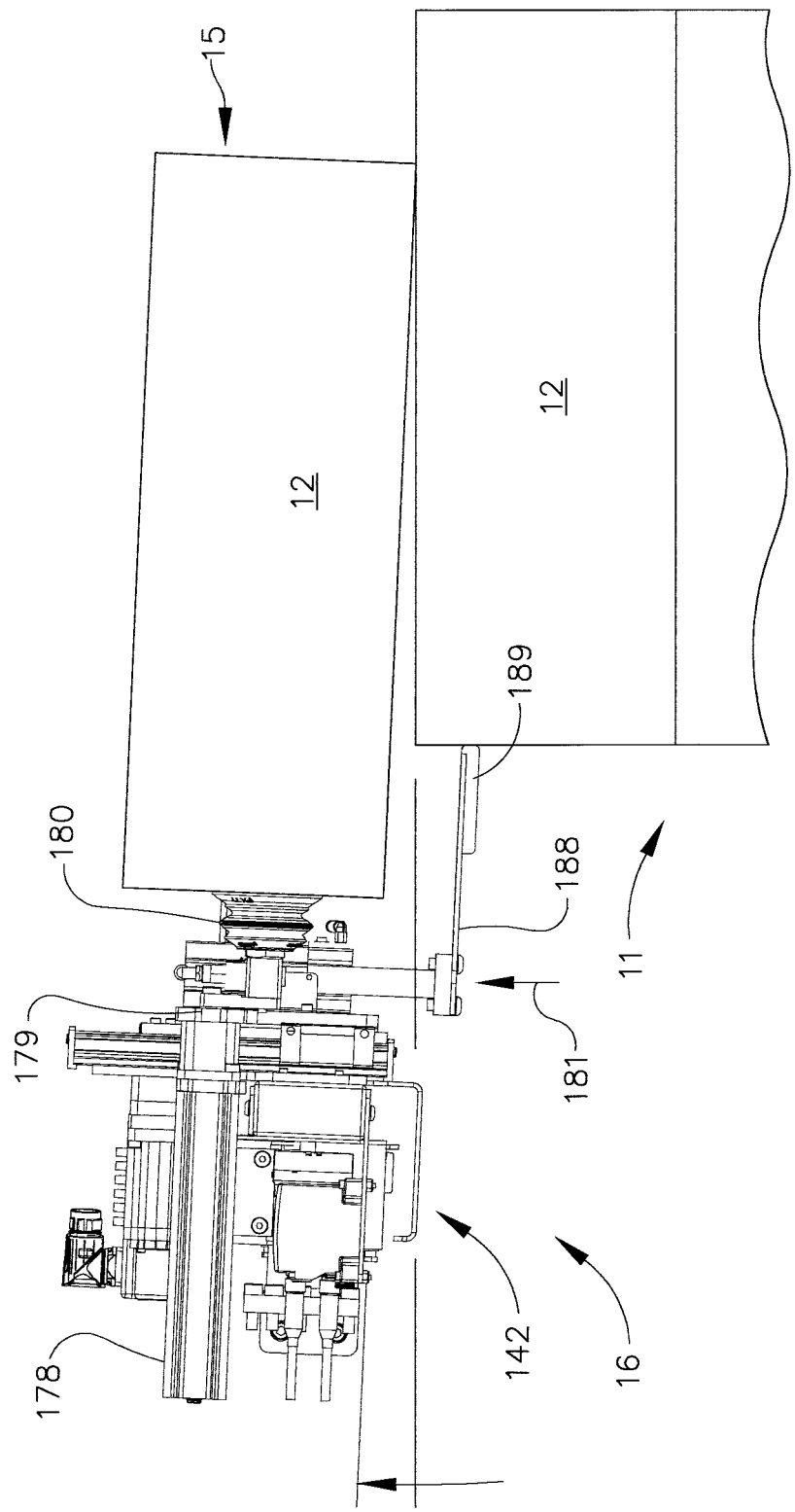
FIG. 20 illustrates a side view of the fourth step of unloading wherein the manipulator of FIG. 19 is raised to tip the row of articles as shown.

In FIG. 20, the manipulator 142 is lifted and rotated to tip the row 15 of articles 12 as shown. The front faces 112*f* of the articles 12 are held or gripped securely to the manipulator 142 by vacuum cups 180 with sufficient force to lift at least a portion of articles 12 therewith. The gripped front face 112*f* of the articles 12 lifts with the manipulator 142 while a lower edge of the rear surface 112*r* remains in contact with the article pile 11 to create an angled gap therebetween. Each of the shelves 188a-c remain extended down along the vertical 181 to act as the bumper holding the article pile 11 in place.

Figure 21:
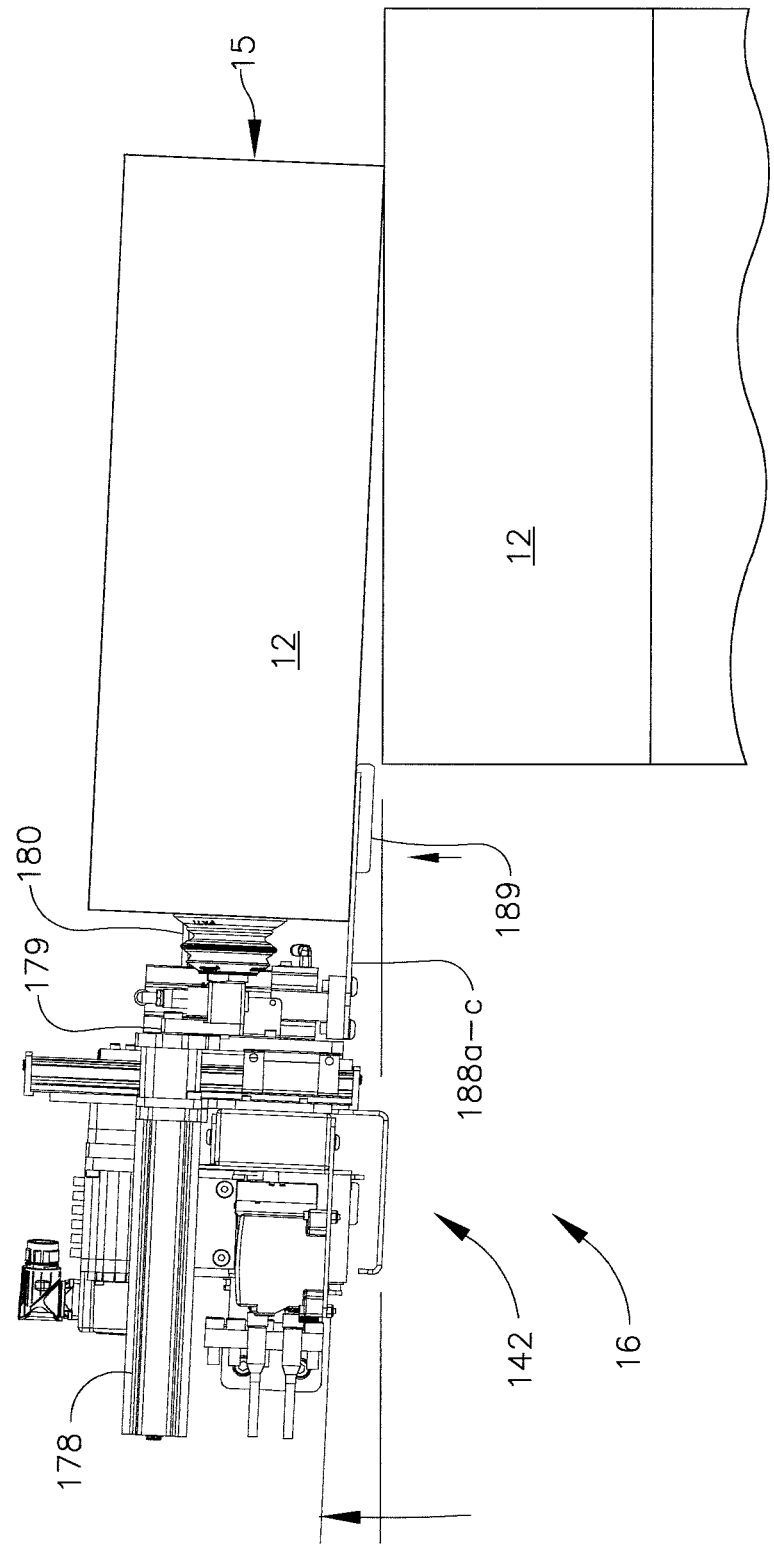
FIG. 21 illustrates a side view of the fifth step of unloading wherein the shelves of FIG. 19 are raised to touch an underside of the row of articles as shown.

In FIG. 21, are raised to the position shown as the manipulator 142 is rising upwards (see left hand arrow). The shelves 188a-c rise to contact a bottom face 112b of the articles 12 to prevent drooping of the articles 12 and to provide additional lifting support. In some cases, the article 12 can be supported entirely in the air by the contact of the vacuum cups 180 with the front face 112f before the shelves 188a-c rise to contact the bottom face 112b of the articles 12. The shelves 188a-c and tines 189 are a shelf (188) and bumper (189) combination used to hold the article pile 11 in place and to receive articles 12 thereon as described and taught in previously mentioned Non Provisional patent application Ser. No. 14/279,694 entitled ROBOTIC CARTON UNLOADER filed May 6, 2014, pending, and assigned to the assignee hereof and hereby expressly incorporated by reference in its entirety.

Figure 22:
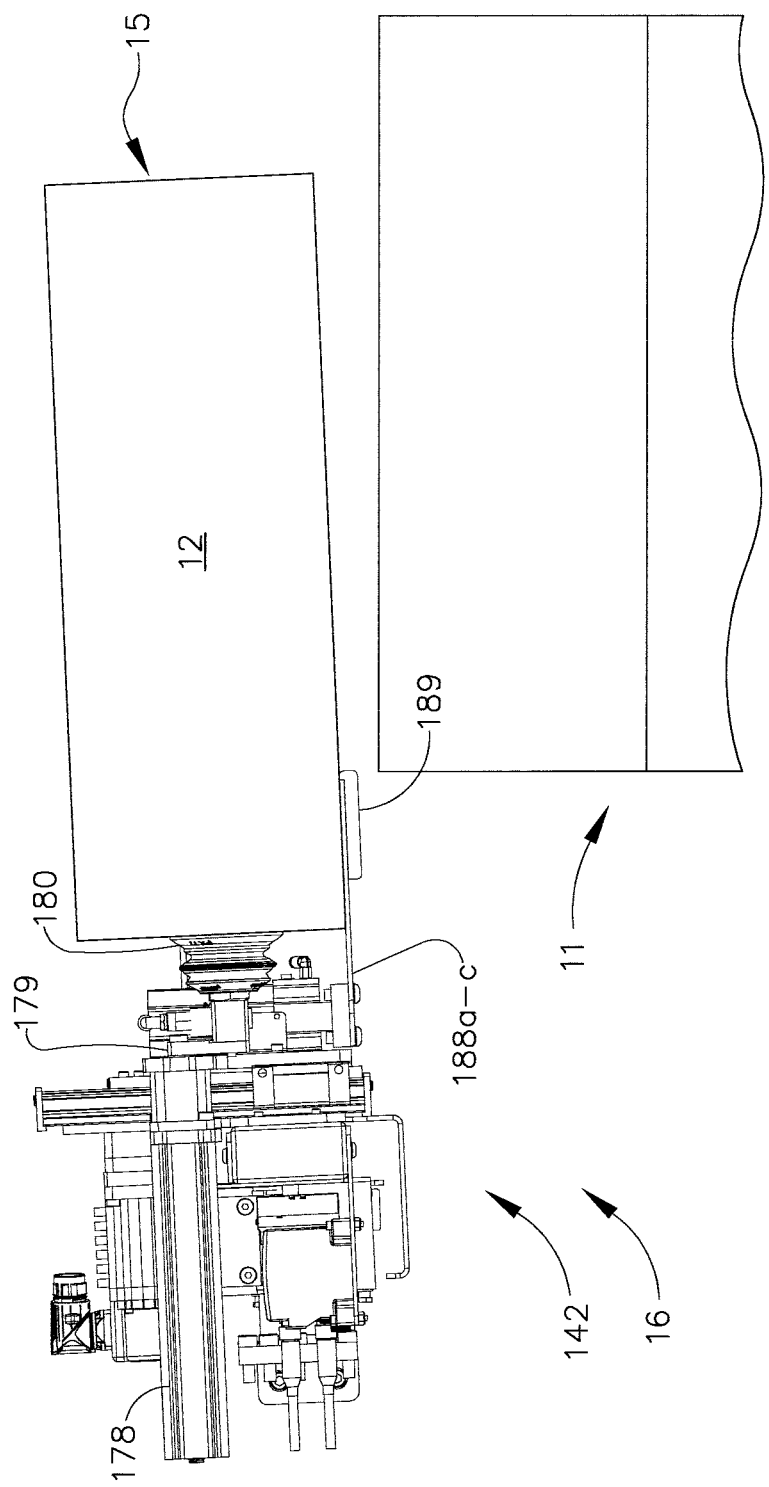
FIG. 22 illustrates a side view of the sixth step of unloading wherein the manipulator of FIG. 19 is tipped as shown and is moving away from the carton pile.
Figure 22A:
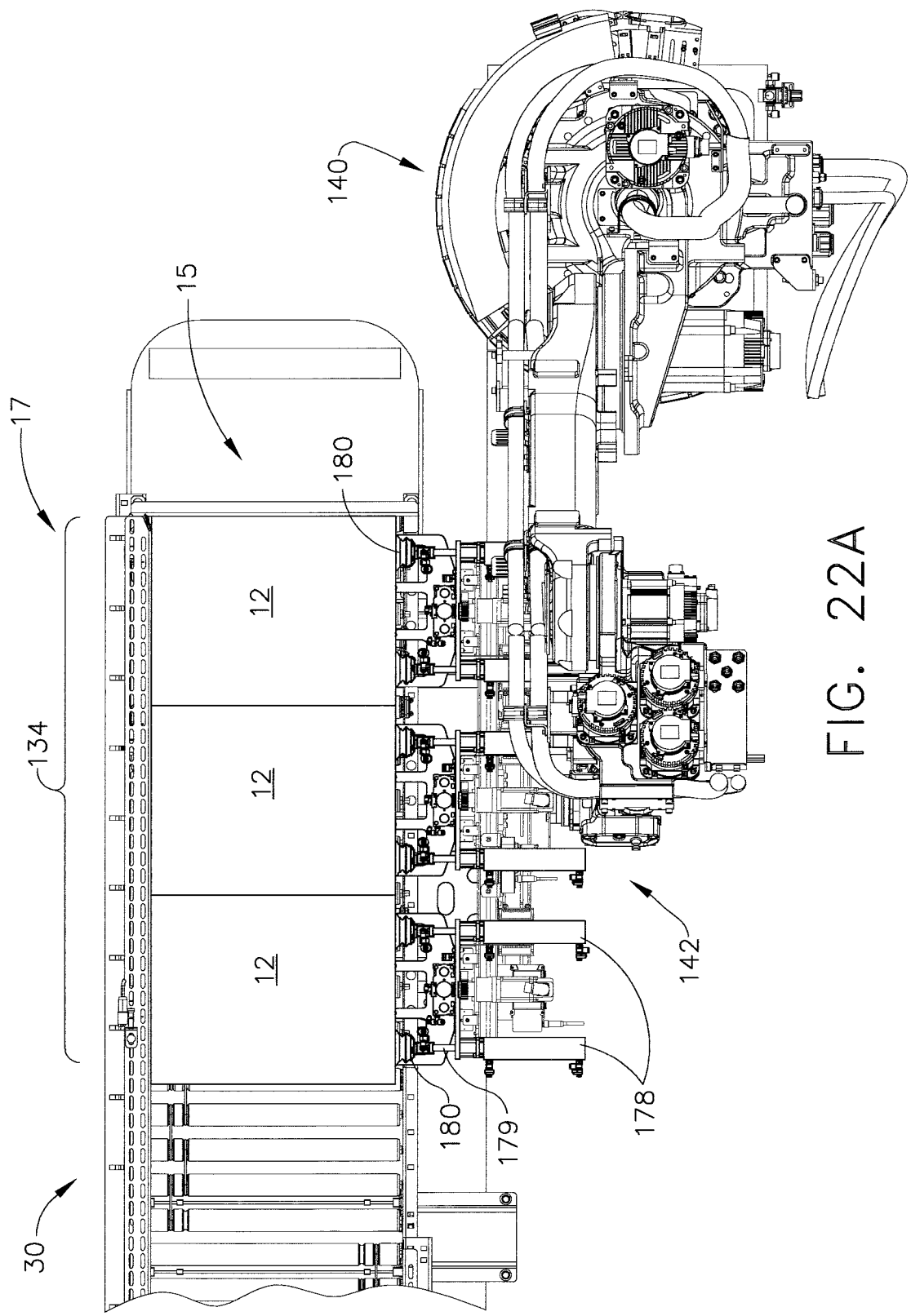
FIG. 22A illustrates a top view of the seventh and last step of unloading wherein the articles picked up by the manipulator of FIG. 19 are placed onto the exchange area of the body conveyor.

In FIG. 22, the manipulator 142 has tipped to a new position as shown which fully lifts articles 12 of row 15 from contact with the article pile 11. In this view, manipulator 142 is moving away from the article pile 11. Vacuum cups 180 and shelves 188a-c hold the row 15 of articles 12 securely. Robot arm 140 can now move manipulator 142 away from this first position 16 and to the second position 17 on the exchange area 134 of the body conveyor 130 as shown in FIG. 22A. Once the articles 12 are on the conveyor 130, the articles 12 can be conveyed out of the truck 10 with conveyor 130 and extendable conveyor 190. The above described loading process is used to unload all articles 12 from the carton pile with the exception of the lower row 15 of articles 12 found resting on one of the floors 18, 18a.

For unloading articles 12 from the lower row (not shown), the shelves 188a-c are moved to the full up position illustrated by shelf 188b in FIG. 3. The manipulator 142 moves to a position above the floor and front of the selected row 15 in a nose angled down position with the vacuum cups 180 extended and the vacuum to the cups 180 turned on. The vacuum cups 180 are moved angularly towards articles 12 in row 15 until the front faces 112f of the articles are contacted. Rods 179 and vacuum cups 180 retract back fully to draw the articles 12 onto the manipulator 142 while the shelves 188a-c are dropped below the incoming articles 12. Once the rods 179 and vacuum cups 180 are fully retracted, the shelves 188a-c are raised up to contact the bottom faces 112b of the row of articles 12, and the row 15 is picked up, moved, and put down on the exchange zone 134.

FIGS. 23-27 illustrate how the manipulator 142 of the present innovation is configurable to match with each of the articles 12 at the first location 16 for pick up, and reconfigurable to match the manipulator 142 and the picked up articles 12 to the second location 17 prior to placing the articles 12 down. For unloading, the first location is the irregular article pile 11, and the second location is the exchange area 134 of body conveyor 130. Prior to FIG. 23, camera 127 has imaged the irregular carton pile 11 and system control box 124 has identified the edges of the articles 12 and the location of the article pile 11 relative to the robot arm 140. From that information, system control box 124 determined the appropriate unloading sequence which follows. Based on the snapshot, the three individually movable head elements 160a, 160b, and 160c were first configured vertically to match the irregular row of cartons 12a-12c on the left top row 15 (first location 16).

FIG. 23 is an isometric view of the trailer 11 with the article pile 11 being unloaded. FIG. 24 is an enlarged view a portion of FIG. 23 showing a top isometric view of the manipulator 142 and cartons 121, 12b and 12c. FIG. 25 is an underside isometric view of FIG. 24. As shown in FIGS. 23, 24 and 25, the robot arm 140 has moved the manipulator 142 in to contact the articles 12a-12c of the selected row 15 on the upper left hand side of the article pile 11. Next, the manipulator 142, using the carton withdrawing process shown in FIGS. 16-19 and described above, moves the irregular row 15 of articles 12a-12c partially out of the article pile as shown in FIG. 23. Tines 189 of shelves 188 are stabilizing the articles 12 below the selected row 15 of articles 12a-12c.

Figure 26:
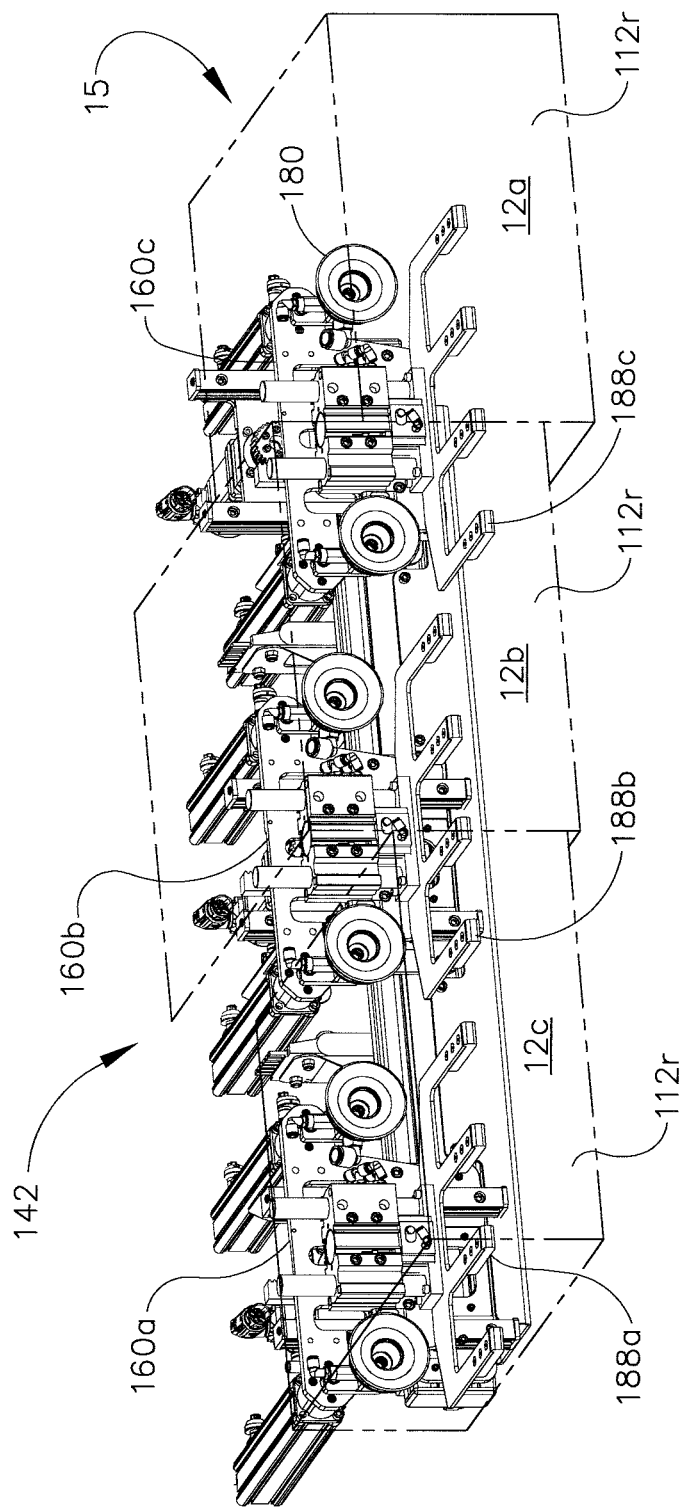
FIG. 26 illustrates an isometric front view of the manipulator of FIG. 22 shown after removing the irregular row of articles and with the articles in outline to show the manipulator irregularly configured therebehind.

FIG. 26 shows the manipulator 142 moved away from the article pile 11 and showing the individually movable head elements 160a-c attached to respective articles 12a-c. Each of articles 12a, 12b, and 12c are shown in outline, and each article 12a-c has a different height. For example, the rear face of article 12c can be seen to be shorter in height than the rear faces 112f of articles 12b and 12a. The vertical configuration of each of the individually movable head elements 160a, 160b, and 160c can be seen through the dashed line articles 12a, 12b, 12c. Movable head elements 160a, 160b, and 160c were vertically configured based on the snapshot information prior to picking up the irregular row 15 of articles 12a-12c. In this view, it can be seen that the bottom of each article 12a-12c is at the same vertical distance below the vacuum cups 180.

Figure 27:
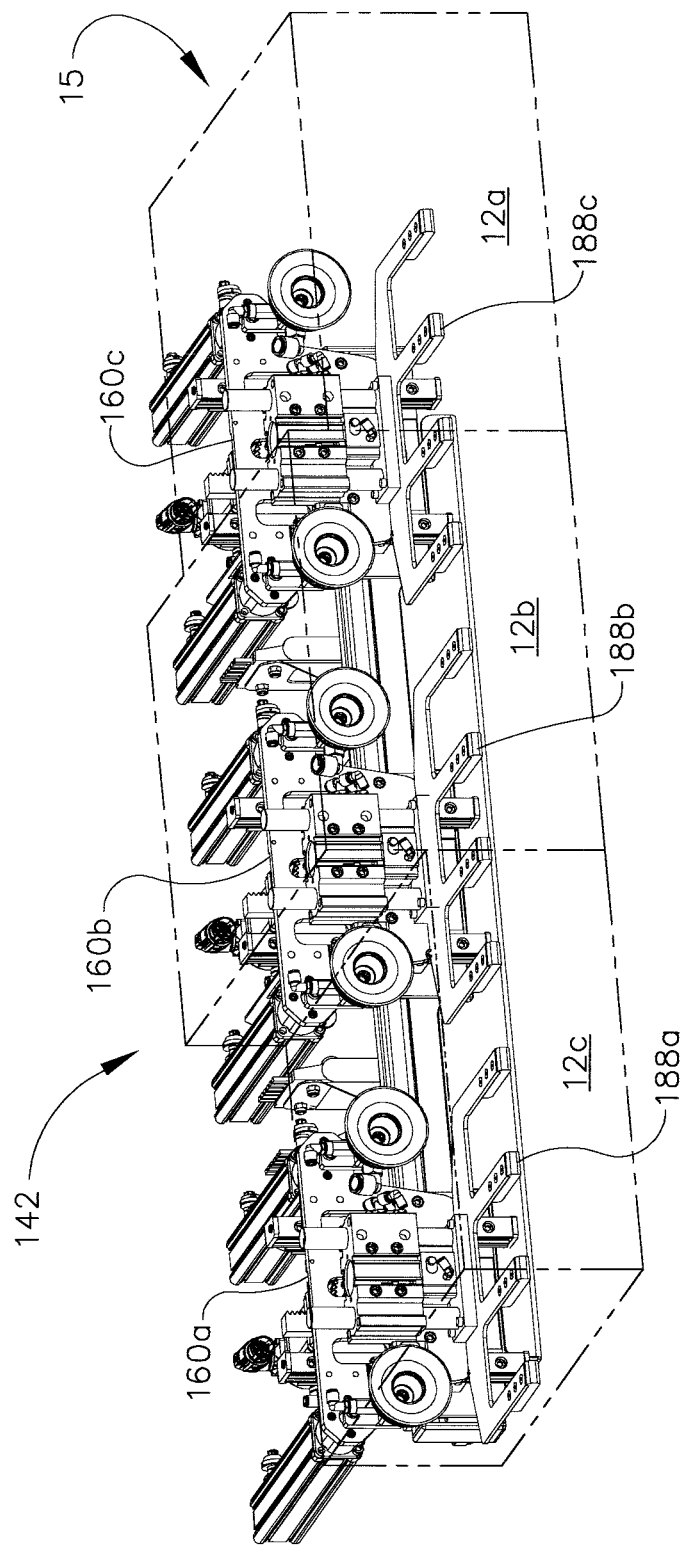
FIG. 27 illustrates an isometric front view of the manipulator of FIG. 26 shown after reconfiguring the irregular row of articles to an even row of articles and with the articles in outline to show the manipulator therebehind.

In FIG. 27, the manipulator 142 has reconfigured the row 15 of articles 12a-12c to have all of the individually movable head elements 160a, 160b, and 160c reconfigured into a horizontal line. Moving individually movable head elements 160a, 160b, and 160c to be horizontal also moves the bottoms of the articles 12a-12c into a horizontal line. With the bottoms of the row 15 of articles 12a-12b in a horizontal line, the row 15 is reconfigured to be placed down onto the exchange area 134 (second location 17) of the body conveyor 130 (see FIG. 22A) and from there, conveyed out of the truck 10. A snapshot of the exchange area 134 is not needed as the location of the exchange area 134 is constant relative to the robot arm 140. Scanners 137 at the exchange area 134 can be used to inform the system control box 124 when the exchange area is cleared and ready to receive another row 15.

One or more of the above described methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the methods are described and illustrated in a particular sequence, use of a specific sequence of functional processes is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An autonomous device for loading and unloading trucks, the autonomous device comprising:
    a mobile body;
    a robot arm coupled to the mobile body to load and unload articles;
    a body conveyor system attached to the mobile body for conveying articles, the conveyor movable in a first direction to feed articles to the robot arm for loading, and movable in a second direction to move articles unloaded thereon out of the truck, and
    a manipulator attached to a movable end of the robot arm and maneuverable within the truck, the manipulator for picking up a row of articles in a first orientation at a first location and for placing the picked-up row of articles on a second location in a second orientation, wherein the manipulator can be configured to match the first orientation of the articles at the first location for picking up the row of articles therefrom and can be reconfigured to match the orientation of the picked-up row of articles to the second orientation for placement onto the second location,
    wherein the row of articles at the first location is a horizontal row and the row of articles for placement onto the second location is an irregular row of articles and the manipulator is configured to match with the horizontal row of articles for pick up, and reconfigured to match the first orientation of the manipulator and the picked-up row of articles carried thereon to the second location for placement thereon.

2. The autonomous device of claim 1 wherein each of the plurality of individually movable head elements comprises at least one vacuum cup having a first port connectable to a vacuum source to securely attach the vacuum cup to a front face of an article for movement thereof.

3. The autonomous device of claim 2 wherein each vacuum cup further comprises a second port attached thereto with the second port connectable to a source of compressed air, and when an article is secured to at least one vacuum cup with vacuum, the article can be released therefrom by connecting compressed air to the second port to break the vacuum within the at least one vacuum cups.

4. The autonomous device of claim 2 wherein each of the at least one vacuum cups attach to a rod of a dual acting cylinder having a front and a rear cylinder, the vacuum cups extending away from the manipulator with an application of compressed air to a rear chamber thereof, and retracted towards the manipulator with a second application of compressed air to a front chamber thereof.

5. The autonomous device of claim 4 wherein vacuum is supplied to a vacuum port of the vacuum cup through the dual acting cylinder, the vacuum passing through a rear of the dual acting cylinder and then through the rear chamber in a coiled flexible hose, the coiled hose connecting the vacuum to the vacuum cup through a bore extending through the piston and the rod.

6. The autonomous device of claim 4 wherein the autonomous device further comprises an anti-crush feature configured to prevent damage to the articles during pick up, the anti-crush feature engaged after the rods and vacuum cups are extended and while the manipulator is moving towards the articles identified for pick up, wherein when the vacuum cups contact the articles, the anti-crush feature enables the rods to retract into the moving manipulator to prevent crushing the articles.

7. The autonomous device of claim 4 wherein the manipulator further comprises at least one shelf to receive and support articles.

8. The autonomous device of claim 7 wherein each of the at least one shelves includes tines configured to be pressed against an article pile below a row of articles selected for pick up, the tines stabilizing the article pile during pick up of the selected row.

9. The autonomous device of claim 8 wherein one of the shelves is attached to each of the plurality of individually movable head elements, and each shelf moves vertically with a respective one of the plurality of individually movable head elements.

10. The autonomous device of claim 9 wherein each of the shelves attached to each of the plurality of individually movable head elements moves vertically relative to the respective individually movable head element.

11. The autonomous device of claim 8 wherein the body conveyor system includes an exchange zone for exchanging articles between the manipulator and the body conveyor system, wherein the exchange area can be either of the first location or the second location.

12. The autonomous device of claim 11 wherein the body conveyor system and the exchange zone comprise a horizontal conveying surface, and the exchange zone can accumulate or receive a horizontal row of articles thereon.

13. The autonomous device of claim 12 wherein the exchange zone of the body conveyor system is an accumulator configured to accumulate a plurality of articles thereon, the exchange zone further comprising a sensor for each of the plurality of articles to signal when a row of articles is ready for pick up.

14. The autonomous device of claim 12 wherein the exchange zone of the body conveyor system includes rollers for conveying articles along the conveying surface, wherein gaps exist between rollers and tines of the at least one shelves are configured to fit therebetween during exchanges of rows of articles at the exchange zone.

15. The autonomous device of claim 14 wherein the exchange zone further comprises at least one fork for each article accumulated on the exchange zone, each fork extending at least partially above the conveying surface from the gaps between the rollers, wherein each fork is connected to a fork ram to move the forks into contact with articles and to move the articles across the exchange zone and at least partially onto the manipulator during loading.

16. The autonomous device of claim 15 wherein at least one of the rollers in the exchange zone is a motor driven roller.

17. An autonomous device for loading and unloading trucks, the autonomous device comprising:
a mobile body;
a robot arm coupled to the mobile body to load and unload articles;
a body conveyor system attached to the mobile body for conveying articles, the conveyor movable in a first direction to feed articles to the robot arm for loading, and movable in a second direction to move articles unloaded thereon out of the truck, and
a manipulator attached to a moveable end of the robot arm and maneuverable within the truck, the manipulator for picking up a row of articles in a first orientation at a first location and for placing the picked-up row of articles on a second location in a second orientation, wherein the manipulator can be configured to match the first orientation of the articles at the first location for picking up the row of articles therefrom and can be reconfigured to match the orientation of the picked-up row of articles to the second orientation for placement onto the second location,
wherein the row of articles at the first location is an irregular row of articles and the row of articles at the second location is a horizontal row of articles and the manipulator is configured to match with the irregular row of articles at the first location for pick up, and reconfigured to match the picked-up row of articles carried thereon to the horizontal second location for placement thereon.

18. The autonomous device of claim 17 wherein each of the plurality of individually movable head elements comprises at least one vacuum cup having a first port connectable to a vacuum source to securely attach the vacuum cup to a front face of an article for movement thereof.

19. The autonomous device of claim 18 wherein each vacuum cup further comprises a second port attached thereto with the second port connectable to a source of compressed air, and when an article is secured to at least one vacuum cup with vacuum, the article can be released therefrom by connecting compressed air to the second port to break the vacuum within the at least one vacuum cups.

20. The autonomous device of claim 18 wherein each of the at least one vacuum cups attach to a rod of a dual acting cylinder having a front and a rear cylinder, the vacuum cups extending away from the manipulator with an application of compressed air to a rear chamber thereof, and retracted towards the manipulator with a second application of compressed air to a front chamber thereof.

21. The autonomous device of claim 20 wherein vacuum is supplied to a vacuum port of the vacuum cup through the dual acting cylinder, the vacuum passing through a rear of the dual acting cylinder and then through the rear chamber in a coiled flexible hose, the coiled hose connecting the vacuum to the vacuum cup through a bore extending through the piston and the rod.

22. The autonomous device of claim 20 wherein the autonomous device further comprises an anti-crush feature configured to prevent damage to the articles during pick up, the anti-crush feature engaged after the rods and vacuum cups are extended and while the manipulator is moving towards the articles identified for pick up, wherein when the vacuum cups contact the articles, the anti-crush feature enables the rods to retract into the moving manipulator to prevent crushing the articles.

23. The autonomous device of claim 20 wherein the manipulator further comprises at least one shelf to receive and support articles.

24. The autonomous device of claim 23 wherein each of the at least one shelves includes tines configured to be pressed against an article pile below a row of articles selected for pick up, the tines stabilizing the article pile during pick up of the selected row.

25. The autonomous device of claim 24 wherein one of the shelves is attached to each of the plurality of individually movable head elements, and each shelf moves vertically with a respective one of the plurality of individually movable head elements.

26. The autonomous device of claim 25 wherein each of the shelves attached to each of the plurality of individually movable head elements moves vertically relative to the respective individually movable head element.

27. The autonomous device of claim 24 wherein the body conveyor system includes an exchange zone for exchanging articles between the manipulator and the body conveyor system, wherein the exchange area can be either of the first location or the second location.

28. The autonomous device of claim 27 wherein the body conveyor system and the exchange zone comprise a horizontal conveying surface, and the exchange zone can accumulate or receive a horizontal row of articles thereon.

29. The autonomous device of claim 28 wherein the exchange zone of the body conveyor system is an accumulator configured to accumulate a plurality of articles thereon, the exchange zone further comprising a sensor for each of the plurality of articles to signal when a row of articles is ready for pick up.

30. The autonomous device of claim 28 wherein the exchange zone of the body conveyor system includes rollers for conveying articles along the conveying surface, wherein gaps exist between rollers and tines of the at least one shelves are configured to fit therebetween during exchanges of rows of articles at the exchange zone.

31. The autonomous device of claim 30 wherein the exchange zone further comprises at least one fork for each article accumulated on the exchange zone, each fork extending at least partially above the conveying surface from the gaps between the rollers, wherein each fork is connected to a fork ram to move the forks into contact with articles and to move the articles across the exchange zone and at least partially onto the manipulator during loading.

32. The autonomous device of claim 30 wherein at least one the rollers in the exchange zone is a motor driven roller.

33. An autonomous device for loading and unloading trucks, the autonomous device comprising:
a mobile body;
a robot arm coupled to the mobile body to load and unload articles;
a body conveyor system attached to the mobile body for conveying articles, the conveyor movable in a first direction to feed articles to the robot arm for loading, and movable in a second direction to move articles unloaded thereon out of the truck, and a manipulator attached to a moveable end of the robot arm and maneuverable within the truck, the manipulator for picking up a row of articles in a first orientation at a first location and for placing the picked-up row of articles on a second location in a second orientation, wherein the manipulator can be configured to match the first orientation of the articles at the first location for picking up the row of articles therefrom and can be reconfigured to the orientation of the picked-up row of articles to the second orientation for placement onto the second location, wherein the manipulator comprises a plurality of individually movable head elements where each can move independently in a vertical direction when configuring and reconfiguring.

34. The autonomous device of claim 33 wherein each of the plurality of individually movable head elements comprises at least one vacuum cup having a first port connectable to a vacuum source to securely attach the vacuum cup to a front face of an article for movement thereof.

35. The autonomous device of claim 34 wherein each vacuum cup further comprises a second port attached thereto with the second port connectable to a source of compressed air, and when an article is secured to at least one vacuum cup with vacuum, the article can be released therefrom by connecting compressed air to the second port to break the vacuum within the at least one vacuum cups.

36. The autonomous device of claim 34 wherein each of the at least one vacuum cups attach to a rod of a dual acting cylinder having a front and a rear cylinder, the vacuum cups extending away from the manipulator with an application of compressed air to a rear chamber thereof, and retracted towards the manipulator with a second application of compressed air to a front chamber thereof.

37. The autonomous device of claim 36 wherein vacuum is supplied to a vacuum port of the vacuum cup through the dual acting cylinder, the vacuum passing through a rear of the dual acting cylinder and then through the rear chamber in a coiled flexible hose, the coiled hose connecting the vacuum, to the vacuum cup through a bore extending through the piston and the rod.

38. The autonomous device of claim 36 wherein the autonomous device further comprises an anti-crush feature configured to prevent damage to the articles during pick up, the anti-crush feature engaged after the rods and vacuum cups are extended and while the manipulator is moving towards the articles identified for pick up, wherein when the vacuum cups contact the articles, the anti-crush feature enables the rods to retract into the moving manipulator to prevent crushing the articles.

39. The autonomous device of claim 36 wherein the manipulator further comprises at least one shelf to receive and support articles.

40. The autonomous device of claim 39 wherein each of the at least one shelves includes tines configured to be pressed against an article pile below a row of articles selected for pick up, the tines stabilizing the article pile during pick up of the selected row.

41. The autonomous device of claim 40 wherein one of the shelves is attached to each of the plurality of individually movable head elements, and each shelf moves vertically with a respective one of the plurality of individually movable head elements.

42. The autonomous device of claim 41 wherein each of the shelves attached to each of the plurality of individually movable head elements moves vertically relative to the respective individually movable head element.

43. The autonomous device of claim 40 wherein the body conveyor system includes an exchange zone for exchanging articles between the manipulator and the body conveyor system, wherein the exchange area can be either of the first location or the second location.

44. The autonomous device of claim 43 wherein the body conveyor system and the exchange zone comprise a horizontal conveying surface, and the exchange zone can accumulate or receive a horizontal row of articles thereon.

45. The autonomous device of claim 44 wherein the exchange zone of the body conveyor system is an accumulator configured to accumulate a plurality of articles thereon, the exchange zone further comprising a sensor for each of the plurality of articles to signal when a row of articles is ready for pick up.

46. The autonomous device of claim 44 wherein the exchange zone of the body conveyor system includes rollers for conveying articles along the conveying surface, wherein gaps exist between rollers and tines of the at least one shelves are configured to fit therebetween during exchanges of rows of articles at the exchange zone.

47. The autonomous device of claim 46 wherein the exchange zone further comprises at least one fork for each article accumulated on the exchange zone, each fork extending at least partially above the conveying surface from the gaps between the rollers, wherein each fork is connected to a fork ram to move the forks into contact with articles and to move the articles across the exchange zone and at least partially onto the manipulator during loading.

48. The autonomous device of claim 46 wherein at least one of the rollers in the exchange zone is a motor driven roller.

* * * * *